(12) United States Patent
Merkel et al.

(10) Patent No.: US 9,988,311 B2
(45) Date of Patent: Jun. 5, 2018

(54) ALUMINUM TITANATE COMPOSITIONS, CERAMIC ARTICLES COMPRISING SAME, AND METHODS OF MANUFACTURING SAME

(71) Applicant: Corning Incorporated, Corning, NY (US)

(72) Inventors: Gregory Albert Merkel, Corning, NY (US); Patrick David Tepesch, Corning, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 605 days.

(21) Appl. No.: 14/533,595

(22) Filed: Nov. 5, 2014

(65) Prior Publication Data

US 2015/0143786 A1  May 28, 2015

Related U.S. Application Data

(60) Provisional application No. 61/909,580, filed on Nov. 27, 2013.

(51) Int. Cl.
*B01D 39/06* (2006.01)
*B01D 39/20* (2006.01)
(Continued)

(52) U.S. Cl.
CPC ........ *C04B 35/478* (2013.01); *B01D 46/2418* (2013.01); *C04B 35/64* (2013.01); *C04B 38/0006* (2013.01); *C04B 38/06* (2013.01); *C04B 2235/3206* (2013.01); *C04B 2235/3224* (2013.01); *C04B 2235/3225* (2013.01); *C04B 2235/3227* (2013.01); *C04B 2235/3229* (2013.01); *C04B 2235/3234* (2013.01); *C04B 2235/3244* (2013.01); *C04B 2235/3248* (2013.01); *C04B 2235/3249* (2013.01); *C04B 2235/3418* (2013.01); *C04B 2235/3427* (2013.01); *C04B 2235/3463* (2013.01); *C04B 2235/3481* (2013.01); *C04B 2235/36* (2013.01); *C04B 2235/6562* (2013.01); *C04B 2235/6565* (2013.01); *C04B 2235/6567* (2013.01);
(Continued)

(58) Field of Classification Search
None
See application file for complete search history.

(56) References Cited

U.S. PATENT DOCUMENTS

| | | | |
|---|---|---|---|
| 4,329,162 A | 5/1982 | Pitcher, Jr. | |
| 4,483,944 A * | 11/1984 | Day | B01J 21/12 |
| | | | 428/116 |

(Continued)

FOREIGN PATENT DOCUMENTS

| | | |
|---|---|---|
| CN | 1277173 A | 12/2000 |
| JP | 2010235333 A | 10/2010 |
| WO | 2008/005249 | 1/2008 |

OTHER PUBLICATIONS

PCT/US2014/067292 Search Report dated Feb. 6, 2015.
(Continued)

*Primary Examiner* — Amber R Orlando

(57) ABSTRACT

Disclosed are ceramic bodies comprised of a tialite phase and at least one silicate phase with a rare earth oxide and zirconium additions and methods for the manufacture of the same.

33 Claims, 2 Drawing Sheets

(51) Int. Cl.
*B01D 39/14* (2006.01)
*B01D 50/00* (2006.01)
*C04B 35/478* (2006.01)
*C04B 35/64* (2006.01)
*C04B 38/06* (2006.01)
*C04B 38/00* (2006.01)
*B01D 46/24* (2006.01)

(52) U.S. Cl.
CPC .... *C04B 2235/72* (2013.01); *C04B 2235/725* (2013.01); *C04B 2235/80* (2013.01)

(56) References Cited

U.S. PATENT DOCUMENTS

| | | | | |
|---|---|---|---|---|
| 5,246,893 | A * | 9/1993 | Takagi | C04B 35/119 428/813 |
| 2008/0057268 | A1* | 3/2008 | Lu | C04B 35/195 428/116 |
| 2010/0237007 | A1* | 9/2010 | Merkel | B01D 46/2418 210/510.1 |
| 2011/0105318 | A1 | 5/2011 | Raffy et al. | 502/439 |
| 2011/1052075 | | 6/2011 | Raffy et al. | 502/439 |
| 2012/0124953 | A1 | 5/2012 | Raffy et al. | 55/523 |
| 2012/0171412 | A1* | 7/2012 | Raffy | B01D 39/2093 428/116 |
| 2012/0276325 | A1* | 11/2012 | Raffy | C04B 35/478 428/116 |
| 2013/0111862 | A1 | 5/2013 | Divens-Dutcher et al. | 55/523 |
| 2014/0128243 | A1* | 5/2014 | Grohol | C04B 35/185 501/134 |

OTHER PUBLICATIONS

Database WPI, Week 200123, Thomson Scientific, London, GB; AN 2001-219134- & CN 1 227 173 A (HU Y) Dec. 20, 2000 (Dec. 20, 2000).

* cited by examiner

ALUMINUM TITANATE COMPOSITIONS, CERAMIC ARTICLES COMPRISING SAME, AND METHODS OF MANUFACTURING SAME

This application claims the benefit of priority under 35 U.S.C. § 119 of U.S. Provisional Application Ser. No. 61/909,580 filed on Nov. 27, 2013, the contents of which are relied upon and incorporated herein by reference in their entirety as if fully set forth below.

BACKGROUND

1. Field

Exemplary embodiments of the present disclosure relate to ceramic compositions, ceramic articles and methods of manufacturing the same and, more particularly, to ceramic compositions and ceramic articles including a tialite phase, at least one silicate phase, a rare earth oxide, and zirconium oxide, and methods of manufacturing the same.

2. Discussion of the Background

After-treatment of exhaust gas from internal combustion engines may use catalysts supported on high-surface area substrates and, in the case of diesel engines and some gasoline direct injection engines, a catalyzed filter for the removal of carbon soot particles. Filters and catalyst supports in these applications may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters may be used in these applications.

Since introduction of substrates in the 1970s and filters in the 1980s, there has been an increasing trend toward thinner walls in both substrates and filters to reduce pressure drop. Furthermore, there has recently been a demand for higher porosity filters to further accommodate larger amounts of catalysts within the filter wall. Thinner walls and higher porosity both weaken the structure of the honeycomb article; therefore, inherent flexural strength of the skeletal ceramic material comprising the walls should be high.

Also, in the case of diesel particulate filters (DPFs), a high volumetric heat capacity is desired in order to minimize the temperatures that may be reached during the periodic in situ combustion of the accumulated soot, a process known as "regeneration." Since higher porosity and thinner walls reduce the mass of the filter, it may be desirable that solid material comprising the ceramic body have a high heat capacity per unit volume. To meet combination of properties, aluminum titanate based DPFs were introduced.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide ceramic compositions comprising a tialite phase and at least one silicate phase, the ceramic compositions comprising a rare earth oxide and zirconium oxide.

Exemplary embodiments of the present disclosure also provide a ceramic article comprised of a tialite phase, and at least one silicate phase, the ceramic article comprising a rare earth oxide and zirconium oxide.

Exemplary embodiments of the present disclosure also provide a method of manufacturing a ceramic article comprising a tialite phase and at least one silicate phase, the ceramic article including a rare earth oxide and zirconium oxide.

Additional features of the disclosure will be set forth in the description which follows, and in part will be apparent from the description, or may be learned by practice of the disclosure.

An exemplary embodiment discloses a ceramic composition comprising a tialite phase, at least one silicate phase, at least 1 wt % MgO, at least 0.1 wt % rare earth oxide, and at least 0.1 wt % $ZrO_2$, wherein metal oxide constituents of the ceramic composition satisfy at least one of the relations $$3(\text{mole \% TiO}_2)/(100+\text{mole \% Al}_2\text{O}_3)<1.0 \text{ and}$$

$$[2(\text{mole \% Al}_2\text{O}_3)+3(\text{mole \% MgO})]/110>1.0,$$

wherein mole % $TiO_2$=100[(moles $TiO_2$)/(moles $TiO_2$+moles $Al_2O_3$+moles MgO+moles $ZrO_2$)], mole % $Al_2O_3$=100[(moles $Al_2O_3$)/(moles $TiO_2$+moles $Al_2O_3$+moles MgO+moles $ZrO_2$)], and mole % MgO=100[(moles MgO)/(moles $TiO_2$+moles $Al_2O_3$+moles MgO+moles $ZrO_2$)], where the sum of $ZrO_2$ and the rare earth oxide is greater than 0.5 wt %, and wherein the amount of $Fe_2O_3$ is less than 0.5 wt %.

An exemplary embodiment also discloses a ceramic article comprising a tialite phase, at least one silicate phase, at least 1 wt % MgO, at least 0.1 wt % rare earth oxide, and at least 0.1 wt % $ZrO_2$, wherein metal oxide constituents of the article satisfy at least one of the relations $$3(\text{mole \% TiO}_2)/(100+\text{mole \% Al}_2\text{O}_3)<1.0 \text{ and}$$

$$[2(\text{mole \% Al}_2\text{O}_3)+3(\text{mole \% MgO})]/110>1.0,$$

where mole % $TiO_2$=100[(moles $TiO_2$)/(moles $TiO_2$+moles $Al_2O_3$+moles MgO+moles $ZrO_2$)], mole % $Al_2O_3$=100[(moles $Al_2O_3$)/(moles $TiO_2$+moles $Al_2O_3$+moles MgO+moles $ZrO_2$)], and mole % MgO=100[(moles MgO)/(moles $TiO_2$+moles $Al_2O_3$+moles MgO+moles $ZrO_2$)], wherein the sum of $ZrO_2$ and the rare earth oxide is greater than 0.5 wt %, and wherein the amount of $Fe_2O_3$ is less than 0.5 wt %.

An exemplary embodiment also discloses a method of manufacturing a ceramic article. The method includes compounding an inorganic batch composition comprising a silicon containing source, an aluminum containing source, a titanium containing source, a magnesium containing source, a rare earth containing source, and a zirconium containing source. Mixing the inorganic batch composition together with one or more processing aids selected from the group consisting of a plasticizer, lubricant, binder, pore former, and solvent, to form a plasticized ceramic precursor batch composition. Shaping the plasticized ceramic precursor batch composition into a green body. The method includes firing the green body under conditions effective to convert the green body into a ceramic article comprising a tialite phase, at least one silicate phase, at least 1 wt % MgO, at least 0.1 wt % rare earth oxide, at least 0.1 wt % $ZrO_2$, and wherein the metal oxide constituents of the article satisfy at least one of the relations $$3(\text{mole \% TiO}_2)/(100+\text{mole \% Al}_2\text{O}_3)<1.0 \text{ and}$$

$$[2(\text{mole \% Al}_2\text{O}_3)+3(\text{mole \% MgO})]/110>1.0,$$

where mole % $TiO_2$=100[(moles $TiO_2$)/(moles $TiO_2$+moles $Al_2O_3$+moles MgO+moles $ZrO_2$)], mole % $Al_2O_3$=100[(moles $Al_2O_3$)/(moles $TiO_2$+moles $Al_2O_3$+ moles MgO+moles $ZrO_2$)], and mole % MgO=100[(moles MgO)/(moles $TiO_2$+moles $Al_2O_3$+moles MgO+moles $ZrO_2$)], wherein the sum of $ZrO_2$ and the rare earth oxide is greater than 0.5 wt %, and wherein the amount of $Fe_2O_3$ is less than 0.5 wt %.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1:
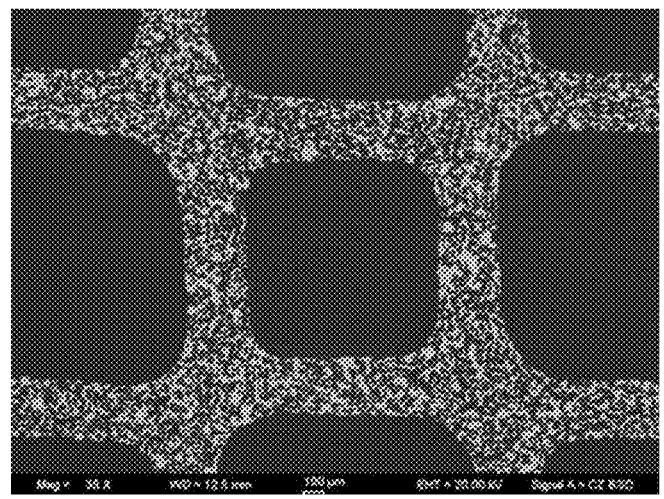
FIG. 1 presents a scanning electron microscope (SEM) micrograph of a polished cross section orthogonal to the channel axes of the ceramic honeycomb of Exemplary Example 7 at a magnification of 35×.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Recently, new catalysts with superior performance have come on the market and have been found to exhibit undesirable chemical interactions with existing ceramic filters and substrates. For example, it has been found that copper can diffuse or leach from chabazite catalyst and promote decomposition of aluminum titanate into corundum and rutile, with loss in thermal shock resistance of aluminum titanate filter. Ceramics comprised of magnesium-stabilized aluminum titanate and at least one of mullite and cordierite provide a more durable filter in the presence of copper than previous magnesium-free compositions. However, to achieve optimum thermal shock resistance and pore microstructure, these ceramics have relied upon the addition of expensive rare earth oxide sintering aids, such as greater than 1.0 wt % cerium oxide. Processes and compositions for reducing the amount of cerium oxide sintering aid while maintaining the desired physical and microstructural properties may be desired to reduce batch cost.

Exemplary embodiments of the disclosure relate to ceramic articles having high thermal shock resistance and comprising at least a tialite phase and at least a second phase comprising a silicate wherein the composition of the ceramic article includes cerium and zirconium. It will be understood that for the purposes of this disclosure that "tialite phase" is a solid solution having a pseudobrookite crystal structure including at least 50 wt % $Al_2TiO_5$. The tialite phase may further comprise magnesium, silicon, zirconium, iron, and other elements. In this disclosure "tialite" may be used interchangeably with "tialite phase" for ease of description.

Ceramic batch compositions and ceramic articles according to these exemplary embodiments include a tialite phase, at least one silicate phase, at least 1 wt % MgO; at least 0.1 wt % rare earth oxide; and at least 0.1 wt % $ZrO_2$; wherein metal oxide constituents of the article satisfy at least one of the relations $$3(\text{mole \% TiO}_2)/(100+\text{mole \% Al}_2O_3)<1.0 \text{ and}$$

$$[2(\text{mole \% Al}_2O_3)+3(\text{mole \% MgO})]/110>1.0,$$

where mole % $TiO_2$=100[(moles $TiO_2$)/(moles $TiO_2$+moles $Al_2O_3$+moles MgO+moles $ZrO_2$)], mole % $Al_2O_3$=100[(moles $Al_2O_3$)/(moles $TiO_2$+moles $Al_2O_3$+moles MgO+moles $ZrO_2$)], and mole % MgO=100[(moles MgO)/(moles $TiO_2$+moles $Al_2O_3$+moles MgO+moles $ZrO_2$)], wherein the sum of $ZrO_2$ and the rare earth oxide is greater than 0.5 wt %, and wherein the amount of $Fe_2O_3$ is less than 0.5 wt %.

In these exemplary embodiments the metal oxide constituents of the ceramic article can further satisfy at least one of the relations 3(mole % $TiO_2$)/(100+mole % $Al_2O_3$)<0.99 and [2(mole % $Al_2O_3$)+3(mole % MgO)]/110>1.01. For example, the metal oxide constituents of the ceramic article can further satisfy at least one of the relations 3(mole % $TiO_2$)/(100+mole % $Al_2O_3$)<0.98 and [2(mole % $Al_2O_3$)+3 (mole % MgO)]/110>1.02, or even at least one of the relations 3(mole % $TiO_2$)/(100+mole % $Al_2O_3$)<0.96 and [2(mole % $Al_2O_3$)+3(mole % MgO)]/110>1.04.

In these exemplary embodiments (wt % $Al_2O_3$)/(wt % $TiO_2$)+1.280(wt % MgO)/(wt % $TiO_2$)>1.28. For example, (wt % $Al_2O_3$)/(wt % $TiO_2$)+1.280(wt % MgO)/(wt % $TiO_2$)> 1.30, or even (wt % $Al_2O_3$)/(wt % $TiO_2$)+1.280(wt % MgO)/(wt % $TiO_2$)>1.32.

Discovery of advantageous physical properties of pseudobrookite-based composites according to these exemplary embodiments of the disclosure involves tradeoffs between decomposition kinetics, thermal expansion coefficient, and strength. The amount of $MgTi_2O_5$ in solid-solution in these exemplary embodiments slows down decomposition kinetics. Higher concentrations of $MgTi_2O_5$ also lower the anisotropy of thermal expansion and increase the thermal expansion along the axis with the lowest thermal expansion. The lower the anisotropy of thermal expansion increases the grain size required for microcracking and the increase in the thermal expansion along the axis with the lowest thermal expansion necessitates more microcracking to achieve a desired CTE level, both tending to give lower strength. Secondary phases, especially those with low thermal expansion, tend to increase strength for the same CTE behavior and reduce the variability in properties with small changes in process. For each composition and desired property set (e.g. porosity and pore size), an optimum range of secondary phase content was discovered. This optimum range of secondary phases is specified in the compositional constraints of the exemplary embodiments of the present disclosure.

The combined addition of a cerium oxide component and a zirconium oxide component to aluminum titanate-silicate ceramic according to exemplary embodiments of the disclosure provides a lower coefficient of thermal expansion, and higher thermal shock resistance, than can be achieved with equivalent amounts of either cerium oxide or zirconium oxide alone, thereby enabling a substantial reduction in the amount of cerium oxide required to achieve a given coefficient of thermal expansion (CTE), and a reduction in the cost of the raw material ingredients to make the ceramic article. In some embodiments, the addition of zirconium oxide to the ceramic may also increase the % porosity of the ceramic, thereby enabling the use of a lower amount of pore forming agent, which may allow for a shorter firing cycle or higher select rate of non-cracked ware after firing.

In these exemplary embodiments, the silicate can comprise one or more of mullite, cordierite, and a glass phase. Cordierite, if present, may comprise either or both of a hexagonal and orthorhombic phase based upon the composition $Mg_2Al_4Si_5O_{18}$ and its solid solutions. The ceramic may comprise 50-99 wt % tialite, 0-50 wt % mullite, and 0-50 wt % cordierite, wherein mullite+cordierite is >0 wt %. Additional phases may include, for example, corundum, magnesium aluminate rich spinel, sapphirine, rutile, cerium oxide solid solution, zirconium oxide solid solution, zirconium titanate, zircon, and a cerium titanate phase such as $Ce_2Ti_2O_6$. In some exemplary embodiments, the amount of cordierite can be between 0 and 5 weight percent, the amount of mullite can be between 3 and 50 weight percent, for example, the amount of mullite can be between 10 and 30 weight percent, and the amount of tialite can be between 50 and 93 weight percent, for example, the amount of tialite can be between 60 and 85 weight percent, as measured by x-ray diffractometry (XRD). For example, the ceramic can be cordierite-free. In other exemplary embodiments, the amount of cordierite can be between 10 and 30 weight percent (wt %), the amount of mullite can be between 3 and 15 weight percent, and the amount of tialite can be between 50 and 75 weight percent.

In these exemplary embodiments, the composition of the tialite phase satisfies the relation of $0.03 \leq m \leq 0.30$ and $0.0 \leq f \leq 0.015$, wherein m is the number of magnesium atoms and f is the number of iron atoms per 5 oxygen formula unit. In exemplary embodiments, the value of "m" is at least 0.03, because the presence of magnesium has been found to increase the thermal stability of tialite in the presence of a copper-containing phase, such as a copper-containing zeolite catalyst. For example, the value of "m" can be at least 0.05, at least 0.06, at least 0.08, and even at least 0.1. To maintain low coefficient of thermal expansion, the value of "m" can be less than or equal to 0.3, for example, less than or equal to 0.2, less than or equal to 0.1, and even less than or equal to 0.07. For example, m can be greater than or equal to 0.03 and less than or equal to 0.1 or m can be greater than or equal to 0.03 and less than or equal to 0.07.

In these exemplary embodiments, the value of "f" can be no more than 0.015, for example, not more than 0.013, not more than 0.011, not more than 0.009, not more than 0.007, or even not more than 0.005, because the presence of iron in the tialite phase has been found to result in excessive thermal cycling growth. The amount of $Fe_2O_3$ in the fired ceramic article can be less than 0.5 wt %, for example, less than 0.3 wt %, and even less than 0.1 wt %.

In these exemplary embodiments of the disclosure, the amount of zirconium oxide, $ZrO_2$, in the ceramic article can be at least 0.1 wt %, for example, at least 0.2 wt %, at least 0.5 wt %, at least 1 wt %, at least 3 wt %, at least 5 wt %, and even at least 10% by weight as measured by chemical analysis of the ceramic. To maintain high thermal shock resistance, the amount of zirconium oxide can be not more than about 25% by weight, for example, not more than about 20% by weight, even not more than about 15% by weight. For example, the amount of zirconium oxide, $ZrO_2$, in the ceramic article can be between 0.2 and 10 wt %, between 0.2 and 5 wt %, or even between 0.5 and 3.5 wt %. The amount of cerium oxide, $CeO_2$, in the ceramic article can be between about 0.1 and 3 weight percent, for example, between about 0.25 and 1.5 weight percent, and even between about 0.4 and 1 weight percent, to provide sufficient cerium oxide to promote sintering while still minimizing the cost of the raw materials. In these exemplary embodiments of the disclosure, the sum of the amount of zirconium oxide, $ZrO_2$, and cerium oxide, $CeO_2$ in the ceramic article can be at least 0.5 wt %, for example, the sum can be at least 0.7 wt %, at least 1 wt %, at least 2 wt %, at least 4 wt %, at least 7 wt %, and even at least 13% by weight as measured by chemical analysis of the ceramic.

In these exemplary embodiments of the disclosure, the mean coefficient of thermal expansion of the ceramic article as measured between room temperature and 1000° C. can be not more than $25 \times 10^{-7}$ °C.$^{-1}$, for example, not more than $20 \times 10^{-7}$ °C.$^{-1}$, not more than $15 \times 10^{-7}$ °C.$^{-1}$, not more than $10 \times 10^{-7}$ °C.$^{-1}$, and even not more than $7 \times 10^{-7}$ °C.$^{-1}$. The value of MOR/E, where MOR is the four-point modulus of rupture and E is Young's elastic modulus as measured by sonic resonance, both measured at room temperature, can be at least $0.09 \times 10^{-2}$, for example, at least $0.10 \times 10^{-2}$, at least $0.11 \times 10^{-2}$, at least $0.12 \times 10^{-2}$, and even at least $0.13 \times 10^{-2}$.

When used as an exhaust gas particulate filter, the porosity to minimize pressure drop in these exemplary embodiments can be at least 45%, for example, at least 50%, at least 55%, and even at least 60%, as determined by mercury porosimetry. In addition to the relatively high total porosities, ceramic bodies of these exemplary embodiments can also comprise a relatively narrow pore size distribution evidenced by a minimized percentage of relatively fine and/or relatively large pore sizes. To this end, relative pore size distributions can be expressed by a pore fraction which, as used herein, is the percent by volume of porosity, as measured by mercury porosimetry, divided by 100. For example, the quantity $d_{50}$ represents the median pore size based upon pore volume, and is measured in micrometers; thus, $d_{50}$ is the pore diameter at which 50% of the open porosity of the ceramic sample has been intruded by mercury. The quantity $d_{90}$ is the pore diameter at which 90% of the pore volume is comprised of pores whose diameters are smaller than the value of $d_{90}$; thus, $d_{90}$ is also equal to the pore diameter at which 10% by volume of the open porosity of the ceramic has been intruded by mercury. Still further, the quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also expressed in units of micrometers.

The median pore diameter, $d_{50}$, of the pores present in the instant ceramic articles can, in these exemplary embodiments, be at least 10 μm, for example, at least 14 μm, or at least 16 μm. The median pore diameter, $d_{50}$, of the pores present in the disclosed ceramic articles can be less than or equal to 30 μm, for example, do not exceed 25 μm, and even do not exceed 20 μm. The median pore diameter, $d_{50}$, of the pores present in the disclosed ceramic articles can be in the range of from 8 μm to 30 μm, for example, from 10 μm to 25 μm, from 12 μm to 23 μm, and even from 15 μm to 20 μm. To this end, a combination of the aforementioned porosity values and median pore diameter values can provide low clean and soot-loaded pressure drop while maintaining useful filtration efficiency when the ceramic bodies of the present disclosure are used in exhaust filtration applications.

The relatively narrow pore size distribution of these exemplary embodiments of ceramic articles according to the disclosure can be evidenced by the width of the distribution of pore sizes finer than the median pore size, $d_{50}$, further quantified as pore fraction. As used herein, the width of the distribution of pore sizes finer than the median pore size, $d_{50}$, are represented by a "$d_f$" value which expresses the quantity $(d_{50}-d_{10})/d_{50}$. The value of $d_f$ can be no more than 0.40, for example, not more than 0.30, not more than 0.25, not more than 0.20, and even not more than 0.15 to minimize soot-loaded pressure drop when a filter of the ceramic article is in the bare or catalyzed state. To this end, a relatively low $d_f$ value indicates a low fraction of fine pores, and low values of $d_f$ can be beneficial for ensuring low soot-loaded pressure drop when the ceramic bodies are utilized in diesel filtration applications.

The relatively narrow pore size distribution of the disclosed ceramic articles can in another exemplary embodiment also be evidenced by the width of the distribution of pore sizes that are finer or coarser than the median pore size, $d_{50}$, further quantified as a pore fraction. As used herein, the width of the distribution of pore sizes that are finer or coarser than the median pore size, $d_{50}$, are represented by a "$d_{breadth}$" or "$d_b$" value which expresses the quantity $(d_{90}-d_{10})/d_{50}$. To this end, the ceramic structure of the present disclosure in these exemplary embodiments can comprise a $d_b$ value that is less than 1.50, for example, less than 1.25, less than 1.10, or even less than 1.00. The value of $d_b$ of the pores present in the disclosed ceramic articles can be not more than 0.8, for example, not greater than 0.7, and even not greater than 0.6. A relatively low value of $d_b$ can provide a relatively higher filtration efficiency and higher strength for diesel filtration applications.

In these exemplary embodiments of the disclosure, the ceramic bodies exhibit a low coefficient of thermal expansion resulting in excellent thermal shock resistance (TSR). As will be appreciated by one of ordinary skill in the art, TSR is inversely proportional to the coefficient of thermal expansion (CTE). That is, a ceramic article with low thermal expansion will typically have higher thermal shock resistance and can survive the wide temperature fluctuations that are encountered in, for example, diesel exhaust filtration applications. Accordingly, the ceramic articles of the present disclosure can be characterized by having a relatively low coefficient of thermal expansion (CTE) in at least one direction and as measured by dilatometry, that is less than or equal to about $25 \times 10^{-7}/°$ C., for example, less than or equal to $20 \times 10^{-7}/°$ C.; less than or equal to $15 \times 10^{-7}/°$ C., less than or equal to $12 \times 10^{-7}/°$ C., or even less than or equal to $10 \times 10^{-7}/°$ C., across the temperature range of from 25° C. to 1000° C. For example, when the ceramic article is a honeycomb structure, the at least one direction can be in the axial direction.

The thermal shock limit (TSL) is a relative indication of the maximum temperature that an article can withstand within its central interior, without fracturing, when the surface temperature of the article is at some specified temperature, such as 500 or 600° C. During cooling of the ceramic article from a high temperature such as greater than 600° C., fracturing near the surface may occur when the surface temperature cools to about 600° C. while the interior is still at some higher temperature. In these exemplary embodiments of the disclosure, the calculated value of $TSL_{Down}$ (° C.)=600° C.+(MOR/E)/$CTE_{1000-600°\ C.}$, can be at least 800° C., for example, at least 820° C., at least 840° C., at least 860° C., and even at least 880° C. The value $CTE_{1000-600°\ C.}$ is the mean CTE between 1000 and 600° C. upon cooling after the specimen has been heated from room temperature to 1000° C. during the CTE measurement. The calculated value of $TSL_{Down}$ is an indication of how high the temperature within the interior of the article can be before thermal stresses result in fracturing of the article when the surface temperature has cooled from an initially higher temperature to 600° C. The calculated value of $TSL_{Up}$ (° C.)=500° C.+(MOR/E)/$CTE_{500-1000°\ C.}$ can be at least 850° C., at least 900° C., at least 1000° C., at least 1100° C., and even at least 1200° C., where $CTE_{500-1000°\ C.}$ is the mean CTE between 500 and 1000° C. upon heating. The value of $TSL_{Up}$ is an indication of how high the temperature within the interior of the article can be raised before thermal stresses result in fracturing of the article when the surface temperature is at 500° C. after having been heated from an initially lower temperature.

Still further, it should be understood that these exemplary embodiments can exhibit any desired combination of the aforementioned properties. For example, in one embodiment, the CTE (25-1000° C.) can be less than or equal to $12 \times 10^{-7}/°$ C. (for example, less than or equal to $10 \times 10^{-7}/°$ C.), the porosity % P can be at least 45%, the median pore diameter can be at least 14 μm (for example, at least 18 μm), and the value of $d_f$ can be not more than 0.35 (for example, not more than 0.30). Such exemplary ceramic bodies can further exhibit a value of $d_b$ that does not exceed 1.0, for example, that does not exceed 0.85 or that does not exceed 0.75. In these exemplary embodiments, the CTE (25-1000° C.) can be less than or equal to $18 \times 10^{-7}/°$ C. and the porosity % P can be at least 40%. For example, the CTE (25-1000° C.) does not exceed $18 \times 10^{-7}/°$ C. and the porosity % P is at least 60%. In another example, CTE (25-1000° C.) does not exceed $12 \times 10^{-7}/°$ C. and the porosity % P is at least 40%. In a further example, CTE (25-1000° C.) does not exceed $12 \times 10^{-7}/°$ C. and the porosity % P is at least 60%.

The ceramic bodies of the present disclosure can have any shape or geometry suitable for a particular application. In high temperature filtration applications, such as diesel particulate filtration, for which the ceramic bodies are suited, the bodies can have a multicellular structure, such as that of a honeycomb monolith, or a honeycomb formed by multiple honeycomb segments that are secured together, such as by using a ceramic cement. For example, in any of these exemplary embodiments, the ceramic article can comprise a honeycomb structure having an inlet and outlet end or face, and a multiplicity of cells extending from the inlet end to the outlet end, the cells having porous walls. The honeycomb structure can further have cellular densities from 70 cells/in$^2$ (10.9 cells/cm$^2$) to 400 cells/in$^2$ (62 cells/cm$^2$). A portion of the cells at the inlet end or face end can be plugged with a paste having same or similar composition to that of the honeycomb structure, as described in U.S. Pat. No. 4,329, 162 which is hereby incorporated by reference in its entirety as if fully set forth herein. The plugging is only at the ends of the cells which is typically to a depth of about 1 to 20 mm, although this can vary. A portion of the cells on the outlet end but not corresponding to those on the inlet end are plugged. Therefore, each cell is plugged only at one end. An example arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as "wall flow" filters since the flow paths resulting from alternate channel plugging require the exhaust being treated to flow through the porous ceramic cell walls prior to exiting the filter.

Exemplary embodiments of the present disclosure also provide a method of manufacturing aluminum titanate-silicate ceramic articles from a ceramic forming precursor batch composition comprised of certain inorganic powdered raw materials. Generally, the method first comprises providing an inorganic batch composition comprising a silicon containing source, an aluminum containing source, a titanium containing source, a magnesium containing source, a rare earth containing source, and a zirconium containing source. The inorganic batch composition is then mixed together with one or more processing aid(s) selected from the group consisting of a plasticizer, lubricant, binder, pore former, and solvent, to form a plasticized ceramic precursor batch composition. The inorganic powdered raw materials of the inorganic batch composition may be mixed or unmixed prior to mixing together with the one or more processing aid(s). The plasticized ceramic precursor batch composition can be shaped or otherwise formed into a green body, optionally dried, and subsequently fired under conditions effective to convert the green body into a ceramic article. According to these exemplary embodiments of the method, the ceramic article comprises a tialite phase, at least one silicate phase, at least 1 wt % MgO; at least 0.1 wt % rare earth oxide; and at least 0.1 wt % $ZrO_2$, wherein metal oxide constituents of the article satisfy at least one of the relations $$3(\text{mole \% TiO}_2)/(100+\text{mole \% Al}_2O_3)<1.0 \text{ and}$$

$$[2(\text{mole \% Al}_2O_3)+3(\text{mole \% MgO})]/110>1.0,$$

where mole % $TiO_2$=100[(moles $TiO_2$)/(moles $TiO_2$+moles $Al_2O_3$+moles MgO+moles $ZrO_2$)], mole % $Al_2O_3$=100[(moles $Al_2O_3$)/(moles $TiO_2$+moles $Al_2O_3$+moles MgO+moles $ZrO_2$)], and mole % MgO=100[(moles MgO)/(moles $TiO_2$+moles $Al_2O_3$+moles MgO+moles $ZrO_2$)], wherein the sum of $ZrO_2$ and the rare earth oxide is greater than 0.5 wt %, and wherein the amount of $Fe_2O_3$ is less than 0.5 wt %.

The magnesium containing source can, for example and without limitation, be selected from one or more of MgO, $Mg(OH)_2$, $MgCO_3$, $MgAl_2O_4$, $Mg_2SiO_4$, $MgSiO_3$, $MgTiO_3$, $Mg_2TiO_4$, $MgTi_2O_5$, talc, and calcined talc. Alternatively, the magnesium containing source can be selected from one or more of chlorite, or serpentine. The magnesium containing source can have a median particle diameter that does not exceed 35 µm, for example, that does not exceed 30 µm. To this end, as referred to herein, all particle diameters are measured by a laser diffraction technique such as by a Microtrac particle size analyzer.

The aluminum containing source can, for example and without limitation, be selected from an alumina-forming source such as corundum, $Al(OH)_3$, boehmite, diaspore, a transition alumina such as gamma-alumina or rho-alumina. Alternatively, the aluminum containing source can be a compound of aluminum with another metal oxide such as $MgAl_2O_4$, $Al_2TiO_5$, mullite, kaolin, calcined kaolin, pyrophyllite, kyanite, etc. In these embodiments, the weighted average median particle size of the aluminum containing sources can be in the range of from 5 µm to 30 µm, for example, in the range of from 10 µm to 20 µm. In still another example, the alumina source can be a combination of one or more alumina forming sources and one or more compounds of aluminum with another metal oxide.

The titanium containing source can, in addition to the compounds with magnesium or alumina described above, be provided as $TiO_2$ powder.

The silicon containing source can be provided as a $SiO_2$ powder such as quartz, cryptocrystalline quartz, fused silica, diatomaceous silica, low-alkali zeolite, or colloidal silica. Additionally, the silicon containing source can also be provided as a compound with magnesium and/or aluminum, including for example, cordierite, chlorite, talc, kaolin, kyanite, mullite, and the like. In still another embodiment, the median particle diameter of the silicon containing source is preferably at least 5 µm, more preferably at least 10 µm, and still more preferably at least 20 µm.

As described above, a rare earth oxide, for example, cerium oxide, and a zirconium containing source, such as zirconium oxide or zircon ($ZrSiO_4$), can be added to the precursor batch composition. For example, the cerium oxide and zirconium oxide can be added to the precursor batch composition to lower the firing temperature and broaden the firing window required to form the ceramic composition. The sum of the amounts of the cerium oxide and zirconium oxide can, for example, be from 0.5 to 17 weight percent of the total composition. The cerium oxide can be present in an amount of from 0.1 to 3 weight percent of the total composition and the zirconium oxide can be present in an amount of from 0.1 to 15 weight percent of the total composition. For example, the zirconium oxide can be present in an amount of from 0.2 to 10 weight percent of the total composition or even in an amount of from 0.2 to 5 weight percent of the total composition. For example, cerium oxide can be present in an amount of from 0.4 to 1 weight percent of the total composition and the zirconium oxide can be present in an amount of from 0.5 to 3.5 weight percent of the total composition. In these exemplary embodiments, it will be understood that when a certain weight percentage of zirconium oxide is called for, and the zirconium is provided as zircon, the weight percentage of zircon is selected so as to provide the desired amount of zirconium oxide component.

Other sintering aids may be added to the precursor batch composition and can include, for example, one or more of a metal oxide such as at least one of CaO, SrO, $Y_2O_3$, and $La_2O_3$. The sintering aid(s) can be added to the precursor batch composition as oxides, carbonates, silicates, aluminates, hydrates, etc. The sintering additive(s) can be added in an amount of between about 0.1 and 3.0 wt %, for example, between about 0.25 and 2.0 wt %.

Still further, the ceramic precursor batch composition may comprise other additives such as surfactants, oil lubricants and pore-forming material. Non-limiting examples of surfactants that may be used as forming aids are $C_8$ to $C_{22}$ fatty acids, and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, myristic, oleic, linoleic, palmitic acids, and their derivatives, tall oil, stearic acid in combination with ammonium lauryl sulfate, and combinations of all of these. In an illustrative embodiment, the surfactant is lauric acid, stearic acid, oleic acid, tall oil, and combinations of these. In some of these embodiments, the amount of surfactants is from about 0.25% by weight to about 2% by weight.

Non-limiting examples of oil lubricants used as forming aids include light mineral oil, corn oil, high molecular weight polybutenes, polyol esters, a blend of light mineral oil and wax emulsion, a blend of paraffin wax in corn oil, and combinations of these. In some embodiments, the amount of oil lubricants is from about 1% by weight to about 10% by weight. In an exemplary embodiment, the oil lubricants are present from about 3% by weight to about 6% by weight.

The precursor composition can, if desired, contain a pore-forming agent to tailor the porosity and pore size distribution in the fired body for a particular application. A pore former is a fugitive material which evaporates or undergoes vaporization by combustion during drying or heating of the green body to obtain a desired, usually higher porosity and/or coarser median pore diameter. A suitable pore former can include, without limitation, carbon; graphite; starch; wood, shell, or nut flour; polymers such as polyethylene beads; waxes; and the like. When used, a particulate pore former can have a median particle diameter in the range of from 10 μm to 70 μm, and more preferably from 15 μm to 50 μm.

The inorganic ceramic forming batch components, along with any optional sintering aid and/or pore former, can be intimately blended with a liquid vehicle and forming aids which impart plastic formability and green strength to the raw materials when they are shaped into a body. When forming is done by extrusion, most typically a cellulose ether binder such as methylcellulose, hydroxypropyl methylcellulose, methylcellulose derivatives, and/or any combinations thereof, serve as a temporary organic binder, and sodium stearate can serve as a lubricant. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 1% by weight sodium stearate, stearic acid, oleic acid or tall oil, and preferably about 0.6% by weight. The raw materials and the forming aids are typically mixed together in dry form and then mixed with water as the vehicle. The amount of water can vary from one batch of materials to another and therefore is determined by pre-testing the particular batch for extrudability.

The liquid vehicle component can vary depending on the type of material used in order to impart optimum handling properties and compatibility with the other components in the ceramic batch mixture. Typically, the liquid vehicle content is usually in the range of from 15% to 50% by weight of the plasticized composition. In one embodiment, the liquid vehicle component can comprise water. In another embodiment, depending on the component parts of the ceramic batch composition, it should be understood that organic solvents such as, for example, methanol, ethanol, or a mixture thereof can be used as the liquid vehicle.

Forming or shaping of the green body from the plasticized precursor composition may be done by, for example, typical ceramic fabrication techniques, such as uniaxial or isostatic pressing, extrusion, slip casting, and injection molding. Extrusion is preferred when the ceramic article is of a honeycomb geometry, such as for a catalytic converter flow-through substrate or a diesel particulate wall-flow filter. The resulting green bodies can be optionally dried, and then fired in a gas or electric kiln or by microwave heating, under conditions effective to convert the green body into a ceramic article. For example, the firing conditions effective to convert the green body into a ceramic article can comprise heating the green body at a maximum soak temperature in the range of from 1300° C. to 1550° C., for example, in the range of from 1300° C. to 1400° C., or in the range of from 1400° C. to 1500° C., and maintaining the maximum soak temperature for a hold time sufficient to convert the green body into a ceramic article, followed by cooling at a rate sufficient not to thermally shock the sintered article. For example, compositions with higher MgO may be fired at the lower end of the firing range.

To obtain a wall-flow filter, a portion of the cells of the honeycomb structure at the inlet end or face are plugged. The plugging is only at the ends of the cells which is typically to a depth of about 1 to 20 mm, although this can vary. A portion of the cells on the outlet end but not corresponding to those on the inlet end are plugged. Therefore, each cell is plugged only at one end. An exemplary arrangement is to have every other cell on a given face plugged in a checkered pattern.

EXAMPLES

Exemplary embodiments of the disclosure are further described below with respect to certain exemplary and specific embodiments thereof, which are illustrative only and not intended to be limiting. In accordance with some of the embodiments, raw materials having composition as provided in Table 1 were used to prepare a series of ceramic articles having the general inorganic batch composition as provided in Table 2 for Comparative Compositions and Tables 3, 4, and 5 for Exemplary Compositions of embodiments of the disclosure, as well as in Table 11 for Comparative Compositions and Exemplary Compositions of embodiments of the disclosure. All raw material ingredients in Tables 2-5 are expressed in parts by weight. Tables 2-5 provide the raw materials and estimated bulk compositions of mullite-aluminum titanate (MAT) Comparative and Exemplary Examples. Tables 6-10 provide firing conditions, phase composition, and physical properties of mullite-aluminum titanate (MAT) Comparative Examples having Comparative Compositions and Exemplary Examples having Exemplary Compositions. Table 11 provides the raw materials and estimated bulk compositions of cordierite-mullite-aluminum titanate (GMAT) Comparative and Exemplary Examples. Tables 12 and 13 provide firing conditions, phase composition, and physical properties of cordierite-mullite-aluminum titanate (GMAT) Comparative Examples having Comparative Compositions and Exemplary Examples having Exemplary Compositions.

TABLE 1

| Mineral | Median Particle Diameter (μm) | MgO | $Al_2O_3$ | $SiO_2$ | $Fe_2O_3$ | $TiO_2$ | $Na_2O$ | $K_2O$ | CaO | $HfO_2$ | $ZrO_2$ | $CeO_2$ | $B_2O_3$ |
|---|---|---|---|---|---|---|---|---|---|---|---|---|---|
| $Al_2O_3$ | 13 | 0.0033 | 99.80 | 0.0385 | 0.0157 | 0.00 | 0.050 | 0.00 | 0.018 | 0.00 | 0.00 | 0.00 | 0.077 |
| $TiO_2$ | 0.3 | — | — | — | — | 100.00 | 0.00 | 0.00 | 0.00 | 0.00 | 0.00 | 0.00 | — |
| Quartz | 27 | 0.0043 | 0.0693 | 99.8960 | 0.0118 | 0.0070 | 0.0017 | 0.0000 | 0.0069 | 0.00 | 0.0023 | 0.00 | 0.00 |
| Talc | 14 | 31.31 | 0.85 | 60.60 | 1.020 | 0.050 | 0.040 | 0.000 | 0.160 | 0.00 | 0.00 | 0.00 | 0.00 |
| $Mg(OH)_2$ | 3.2 | 68.21 | 0.09 | 0.29 | 0.140 | 0.006 | 0.000 | 0.000 | 0.760 | 0.00 | 0.00 | 0.00 | 0.00 |
| $ZrO_2$ | 5.7 | — | — | — | — | — | — | — | — | — | 100n | — | — |
| Zircon | 5.8 | 0.01 | 1.13 | 31.72 | 0.15 | 0.11 | 0.02 | 0.02 | 0.01 | 2.28 | 63.69 | 0.00 | — |
| $CeO_2$ | 7.1 | 0.00 | 0.48 | — | 0.00 | 0.01 | 0.00 | 0.00 | 0.00 | 0.00 | 0.00 | 99.52 | 0.00 |
| Graphite | 35 | 0.00 | 0.08 | 0.00 | 0.53 | 0.00 | 0.03 | 0.01 | 0.03 | 0.00 | 0.00 | 0.00 | 0.00 |
| Pea Starch | 27 | 0.00 | 0.00 | 0.01 | 0.00 | 0.00 | 0.12 | 0.00 | 0.02 | 0.00 | 0.00 | 0.00 | 0.00 |

*100n refers to 100% nominal

TABLE 2

| | Composition Number | | | | |
|---|---|---|---|---|---|
| | A | B | C | D | E |
| Composition Type | Comparative | Comparative | Comparative | Comparative | Comparative |
| Raw Materials | | | | | |
| Aluminum Oxide | 55.71 | 55.71 | 55.71 | 55.71 | 55.71 |
| Titanium Oxide | 37.18 | 37.18 | 37.18 | 37.18 | 37.18 |
| Quartz | 3.29 | 3.29 | 3.29 | 3.29 | 3.29 |
| Talc | 3.83 | 3.83 | 3.83 | 3.83 | 3.83 |
| Magnesium Hydroxide | 0 | 0 | 0 | 0 | 0 |
| Zirconium Oxide | 0 | 0 | 0 | 0 | 2.00 |
| Cerium Oxide | 0 | 0.50 | 1.50 | 3.00 | 0 |
| Graphite | 10.00 | 10.00 | 10.00 | 10.00 | 10.00 |
| Cross-Linked Pea Starch | 30.00 | 30.00 | 30.00 | 30.00 | 30.00 |
| Methyl Cellulose A | 3.00 | 3.00 | 3.00 | 3.00 | 3.00 |
| Methyl Cellulose B | 1.50 | 1.50 | 1.50 | 1.50 | 1.50 |
| Tall Oil | 1.00 | 1.00 | 1.00 | 1.00 | 1.00 |
| Estimated Wt % Percentages in Fired Ware | | | | | |
| MgO | 1.21 | 1.20 | 1.19 | 1.17 | 1.18 |
| $Al_2O_3$ | 55.80 | 55.53 | 54.98 | 54.18 | 54.71 |
| $SiO_2$ | 5.64 | 5.61 | 5.55 | 5.47 | 5.53 |
| $Fe_2O_3$ | 0.049 | 0.048 | 0.048 | 0.047 | 0.048 |
| $TiO_2$ | 37.26 | 37.07 | 36.71 | 36.17 | 36.53 |
| $Na_2O$ | 0.0124 | 0.0124 | 0.0122 | 0.0121 | 0.0122 |
| $K_2O$ | 0.0042 | 0.0042 | 0.0041 | 0.0041 | 0.0041 |
| CaO | 0.0249 | 0.0248 | 0.0245 | 0.0242 | 0.0244 |
| $ZrO_2$ | 0.00 | 0.00 | 0.00 | 0.00 | 1.96 |
| $CeO_2$ | 0.00 | 0.50 | 1.48 | 2.92 | 0.00 |
| Estimated Moles per 100 g of Fired Ware | | | | | |
| MgO | 0.0299900 | 0.0298405 | 0.0295459 | 0.0291147 | 0.0294007 |
| $Al_2O_3$ | 0.5473150 | 0.5445865 | 0.5392103 | 0.5313421 | 0.5365618 |
| $SiO_2$ | 0.0938261 | 0.0933583 | 0.0924367 | 0.0910879 | 0.0919827 |
| $Fe_2O_3$ | 0.0003052 | 0.0003036 | 0.0003007 | 0.0002963 | 0.0002992 |
| $TiO_2$ | 0.4665174 | 0.4641917 | 0.4596092 | 0.4529026 | 0.4573517 |
| $Na_2O$ | 0.0002004 | 0.0001994 | 0.0001974 | 0.0001945 | 0.0001965 |
| $K_2O$ | 0.0000443 | 0.0000441 | 0.0000437 | 0.0000430 | 0.0000434 |
| CaO | 0.0004441 | 0.0004419 | 0.0004375 | 0.0004311 | 0.0004353 |
| $ZrO_2$ | 0.0000000 | 0.0000000 | 0.0000000 | 0.0000000 | 0.0159445 |
| $CeO_2$ | 0.0000000 | 0.0028965 | 0.0086037 | 0.0169562 | 0.0000000 |
| Total Moles per 100 grams of Fired Ware | 1.1386424 | 1.1358625 | 1.1303849 | 1.1223684 | 1.1322158 |
| Estimated Mole Percentages in Fired Ware | | | | | |
| MgO | 2.63 | 2.63 | 2.61 | 2.59 | 2.60 |
| $Al_2O_3$ | 48.07 | 47.94 | 47.70 | 47.34 | 47.39 |
| $SiO_2$ | 8.24 | 8.22 | 8.18 | 8.12 | 8.12 |
| $Fe_2O_3$ | 0.03 | 0.03 | 0.03 | 0.03 | 0.03 |
| $TiO_2$ | 40.97 | 40.87 | 40.66 | 40.35 | 40.39 |
| $Na_2O$ | 0.02 | 0.02 | 0.02 | 0.02 | 0.02 |
| $K_2O$ | 0.00 | 0.00 | 0.00 | 0.00 | 0.00 |
| CaO | 0.04 | 0.04 | 0.04 | 0.04 | 0.04 |
| $ZrO_2$ | 0.00 | 0.00 | 0.00 | 0.00 | 1.41 |
| $CeO_2$ | 0.00 | 0.26 | 0.76 | 1.51 | 0.00 |

Table 2 also provides estimated wt % of oxides in fired ware, estimated moles of oxides per 100 grams of fired ware, and estimated mole percentages of oxides in fired ware for Comparative Compositions. Comparative Composition A contains no ceria or zirconia. Comparative Compositions B, C, D, and E have only one of ceria or zirconia. Comparative Composition B has about 0.50 wt % ceria as a super addition in the batch composition and about 0.50 wt % in the fired ware, which is about 0.26 mole percent. Comparative Composition C has about 1.50 wt % ceria as a super addition in the batch composition and about 1.48 wt % in the fired ware, which is about 0.76 mole percent. Comparative Composition D has about 3.00 wt % ceria as a super addition in the batch composition and about 2.92 wt % in the fired ware, which is about 1.51 mole percent. Comparative Composition E has about 2.00 wt % zirconia as a super addition in the batch composition and about 1.96 wt % in the fired ware, which is about 1.41 mole percent.

TABLE 3

| | Composition Number | | | | | |
|---|---|---|---|---|---|---|
| | F | G | H | I | K | L |
| Composition Type | Exemplary | Exemplary | Exemplary | Exemplary | Exemplary | Exemplary |
| Raw Materials | | | | | | |
| Aluminum Oxide | 55.71 | 55.71 | 55.71 | 55.71 | 53.50 | 57.70 |
| Titanium Oxide | 37.18 | 37.18 | 37.18 | 37.18 | 41.94 | 32.54 |
| Quartz | 3.29 | 3.29 | 3.29 | 3.29 | 0 | 6.41 |
| Talc | 3.83 | 3.83 | 3.83 | 3.83 | 4.53 | 3.35 |
| Magnesium Hydroxide | 0 | 0 | 0 | 0 | 0 | 0 |
| Zirconium Oxide | 2.00 | 3.00 | 6.00 | 10.00 | 3.00 | 3.00 |
| Cerium Oxide | 0.50 | 0.50 | 0.50 | 0.50 | 0.50 | 0.50 |
| Graphite | 10.00 | 10.00 | 10.00 | 10.00 | 10.00 | 10.00 |
| Cross-Linked Pea Starch | 30.00 | 30.00 | 30.00 | 30.00 | 30.00 | 30.00 |
| Methyl Cellulose A | 3.00 | 3.00 | 3.00 | 3.00 | 3.00 | 3.00 |
| Methyl Cellulose B | 1.50 | 1.50 | 1.50 | 1.50 | 1.50 | 1.50 |
| Tall Oil | 1.00 | 1.00 | 1.00 | 1.00 | 1.00 | 1.00 |
| Estimated Weight Percentages in Fired Ware | | | | | | |
| MgO | 1.18 | 1.17 | 1.13 | 1.09 | 1.38 | 1.02 |
| $Al_2O_3$ | 54.44 | 53.91 | 52.39 | 50.49 | 51.81 | 55.84 |
| $SiO_2$ | 5.50 | 5.45 | 5.29 | 5.10 | 2.70 | 8.17 |
| $Fe_2O_3$ | 0.048 | 0.047 | 0.046 | 0.044 | 0.052 | 0.044 |
| $TiO_2$ | 36.35 | 36.00 | 34.98 | 33.71 | 40.63 | 31.50 |
| $Na_2O$ | 0.0121 | 0.0120 | 0.0117 | 0.0112 | 0.0095 | 0.0144 |
| $K_2O$ | 0.0041 | 0.0040 | 0.0039 | 0.0038 | 0.0026 | 0.0054 |
| CaO | 0.0243 | 0.0241 | 0.0234 | 0.0225 | 0.0242 | 0.0242 |
| $ZrO_2$ | 1.96 | 2.90 | 5.64 | 9.07 | 2.91 | 2.90 |
| $CeO_2$ | 0.49 | 0.48 | 0.47 | 0.45 | 0.48 | 0.48 |
| Estimated Moles per 100 grams of Fired Ware | | | | | | |
| MgO | 0.0292570 | 0.0289779 | 0.0281561 | 0.0271350 | 0.0343168 | 0.0253587 |
| $Al_2O_3$ | 0.5339392 | 0.5287604 | 0.5138466 | 0.4952114 | 0.5081538 | 0.5476228 |
| $SiO_2$ | 0.0915331 | 0.0906550 | 0.0880886 | 0.0848940 | 0.0448652 | 0.1359541 |
| $Fe_2O_3$ | 0.0002977 | 0.0002949 | 0.0002865 | 0.0002761 | 0.0003276 | 0.0002756 |
| $TiO_2$ | 0.4551162 | 0.4507146 | 0.4379898 | 0.4221057 | 0.5087371 | 0.3943746 |
| $Na_2O$ | 0.0001955 | 0.0001936 | 0.0001881 | 0.0001813 | 0.0001539 | 0.0002323 |
| $K_2O$ | 0.0000432 | 0.0000428 | 0.0000416 | 0.0000401 | 0.0000275 | 0.0000573 |
| CaO | 0.0004332 | 0.0004290 | 0.0004169 | 0.0004018 | 0.0004310 | 0.0004320 |
| $ZrO_2$ | 0.0158666 | 0.0235695 | 0.0458086 | 0.0735788 | 0.0235847 | 0.0235637 |
| $CeO_2$ | 0.0028399 | 0.0028124 | 0.0027330 | 0.0026339 | 0.0028142 | 0.0028117 |
| Total Moles per 100 grams of Fired Ware | 1.1295217 | 1.1265 | 1.1176 | 1.1065 | 1.1234 | 1.1307 |
| Estimated Mole Percentages in Fired Ware | | | | | | |
| MgO | 2.59 | 2.57 | 2.52 | 2.45 | 3.05 | 2.24 |
| $Al_2O_3$ | 47.27 | 46.94 | 45.98 | 44.76 | 45.23 | 48.43 |
| $SiO_2$ | 8.10 | 8.05 | 7.88 | 7.67 | 3.99 | 12.02 |
| $Fe_2O_3$ | 0.03 | 0.03 | 0.03 | 0.02 | 0.03 | 0.02 |
| $TiO_2$ | 40.29 | 40.01 | 39.19 | 38.15 | 45.29 | 34.88 |
| $Na_2O$ | 0.02 | 0.02 | 0.02 | 0.02 | 0.01 | 0.02 |
| $K_2O$ | 0.00 | 0.00 | 0.00 | 0.00 | 0.00 | 0.01 |
| CaO | 0.04 | 0.04 | 0.04 | 0.04 | 0.04 | 0.04 |
| $ZrO_2$ | 1.40 | 2.09 | 4.10 | 6.65 | 2.10 | 2.08 |
| $CeO_2$ | 0.25 | 0.25 | 0.24 | 0.24 | 0.25 | 0.25 |

Tables 3 and 4 provide wt % of raw materials in Exemplary batch compositions, estimated wt % of oxides in fired ware, estimated moles of oxides per 100 grams of fired ware, and estimated mole percentages of oxides in fired ware for Exemplary Compositions according to exemplary embodiments of the disclosure.

Referring to Table 3, Exemplary Composition F has about 2.00 wt % zirconia and about 0.50 wt % ceria as super addition in the batch composition and about 1.96 wt % zirconia and 0.49 wt % ceria in the fired ware, which is about 1.40 and 0.25 mole percent, respectively. Exemplary Composition G has about 3.00 wt % zirconia and about 0.50 wt % ceria as super addition in the batch composition and about 2.90 wt % zirconia and 0.48 wt % ceria in the fired ware, which is about 2.09 and 0.25 mole percent, respectively. Exemplary Composition H has about 6.00 wt % zirconia and about 0.50 wt % ceria as super addition in the batch composition and about 5.64 wt % zirconia and 0.47 wt % ceria in the fired ware, which is about 4.10 and 0.24 mole percent, respectively. Exemplary Composition I has about 10.00 wt % zirconia and about 0.50 wt % ceria as super addition in the batch composition and about 9.07 wt % zirconia and 0.45 wt % ceria in the fired ware, which is about 6.65 and 0.24 mole percent, respectively. Exemplary Compositions K and L have about 3.00 wt % zirconia and about 0.50 wt % ceria as super addition in the batch compositions and about 2.90 to 2.92 wt % zirconia and about 0.48 to 0.49 wt % ceria in the fired wares, which is about 2.08 to 2.11 and about 0.25 mole percent, respectively. While Exemplary Compositions K and L have substantially the same amounts of zirconium oxide, cerium oxide, pore formers, and organics, Exemplary Compositions K and L have different amounts of aluminum oxide, titanium oxide, quartz, talc, and magnesium hydroxide.

In Table 4, Exemplary Compositions N, O, P, and Q have either about 4.59 wt % zirconia and about 0.50 wt % ceria or about 9.32 wt % zirconia and about 0.50 wt % ceria as super addition in the batch compositions. In the fired ware, these Exemplary Compositions N, O, P, and Q have about 2.90 to 2.92 wt % zirconia or about 5.63 to 5.80 wt % zirconia and about 0.46 to 0.48 wt % ceria. The mole percent zirconia is about 2.07 to 2.12 or 4.04 to 4.21 and the mole percent ceria is about 0.23 to 0.25. Exemplary Compositions P and Q having about the same amount of zirconia and ceria as Exemplary Compositions N and O, respectively, have decreasing amount of quartz in the raw materials.

TABLE 4

| | Composition Number | | | |
| --- | --- | --- | --- | --- |
| | N | O | P | Q |
| Batch Code | Exemplary | Exemplary | Exemplary | Exemplary |
| Raw Materials | | | | |
| Aluminum Oxide | 55.71 | 55.71 | 55.71 | 55.71 |
| Titanium Oxide | 37.18 | 37.18 | 37.18 | 37.18 |
| Quartz | 3.29 | 3.29 | 1.78 | 0.22 |
| Talc | 3.83 | 3.83 | 3.83 | 3.83 |
| Magnesium Hydroxide | 0 | 0 | 0 | 0 |
| Zirconium Silicate | 4.59 | 9.32 | 4.59 | 9.32 |
| Cerium Oxide | 0.50 | 0.50 | 0.50 | 0.50 |
| Graphite | 10.00 | 10.00 | 10.00 | 10.00 |
| Cross-Linked Pea Starch | 30.00 | 30.00 | 30.00 | 30.00 |
| Methyl Cellulose A | 3.00 | 3.00 | 3.00 | 3.00 |
| Methyl Cellulose B | 1.50 | 1.50 | 1.50 | 1.50 |
| Tall Oil | 1.00 | 1.00 | 1.00 | 1.00 |
| Estimated Weight Percentages in Fired Ware | | | | |
| MgO | 1.15 | 1.10 | 1.17 | 1.13 |
| $Al_2O_3$ | 53.05 | 50.77 | 53.82 | 52.24 |
| $SiO_2$ | 6.83 | 7.96 | 5.47 | 5.31 |
| $Fe_2O_3$ | 0.046 | 0.044 | 0.047 | 0.045 |
| $TiO_2$ | 35.45 | 33.93 | 35.97 | 34.90 |
| $Na_2O$ | 0.0280 | 0.0268 | 0.0284 | 0.0275 |
| $K_2O$ | 0.0000 | 0.0000 | 0.0000 | 0.0000 |
| CaO | 0.0158 | 0.0151 | 0.0159 | 0.0153 |
| $ZrO_2$ | 2.90 | 5.63 | 2.94 | 5.80 |
| $CeO_2$ | 0.48 | 0.46 | 0.48 | 0.47 |
| Estimated Moles per 100 grams of Fired Ware | | | | |
| MgO | 0.0286009 | 0.0273659 | 0.0290160 | 0.0281512 |
| $Al_2O_3$ | 0.5203175 | 0.4979843 | 0.5278871 | 0.5123123 |
| $SiO_2$ | 0.1135976 | 0.1324312 | 0.0909900 | 0.0883442 |
| $Fe_2O_3$ | 0.0002893 | 0.0002768 | 0.0002925 | 0.0002827 |
| $TiO_2$ | 0.4439003 | 0.4247800 | 0.4503653 | 0.4370159 |
| $Na_2O$ | 0.0004522 | 0.0004327 | 0.0004584 | 0.0004443 |
| $K_2O$ | 0.0000000 | 0.0000000 | 0.0000000 | 0.0000000 |
| CaO | 0.0002811 | 0.0002690 | 0.0002834 | 0.0002732 |
| $ZrO_2$ | 0.0235140 | 0.0457227 | 0.0238771 | 0.0470395 |
| $CeO_2$ | 0.0027696 | 0.0026500 | 0.0028099 | 0.0027263 |
| Total Moles per 100 grams of Fired Ware | 1.1337 | 1.1319 | 1.1260 | 1.1166 |
| Estimated Mole Percentages in Fired Ware | | | | |
| MgO | 2.52 | 2.42 | 2.58 | 2.52 |
| $Al_2O_3$ | 45.89 | 43.99 | 46.88 | 45.88 |
| $SiO_2$ | 10.02 | 11.70 | 8.08 | 7.91 |
| $Fe_2O_3$ | 0.03 | 0.02 | 0.03 | 0.03 |
| $TiO_2$ | 39.15 | 37.53 | 40.00 | 39.14 |
| $Na_2O$ | 0.04 | 0.04 | 0.04 | 0.04 |
| $K_2O$ | 0.00 | 0.00 | 0.00 | 0.00 |
| CaO | 0.02 | 0.02 | 0.03 | 0.02 |
| $ZrO_2$ | 2.07 | 4.04 | 2.12 | 4.21 |
| $CeO_2$ | 0.24 | 0.23 | 0.25 | 0.24 |

TABLE 5

| | Composition Number | | | | |
|---|---|---|---|---|---|
| | S | T | U | V | W |
| Batch Code | Exemplary | Exemplary | Exemplary | Exemplary | Exemplary |
| Raw Materials | | | | | |
| Aluminum Oxide | 55.60 | 53.17 | 51.97 | 55.73 | 55.56 |
| Titanium Oxide | 37.05 | 38.34 | 38.98 | 37.17 | 37.14 |
| Quartz | 5.59 | 5.56 | 5.55 | 3.28 | 3.28 |
| Talc | 0 | 0 | 0 | 3.82 | 3.82 |
| Magnesium Hydroxide | 1.76 | 2.92 | 3.50 | 0 | 0 |
| Iron (III) Oxide | 0 | 0 | 0 | 0 | 0.20 |
| Zirconium Oxide | 3.00 | 3.00 | 3.00 | 3.00 | 3.00 |
| Cerium Oxide | 0.50 | 0.50 | 0.50 | 0.50 | 0.50 |
| Graphite | 10.00 | 10.00 | 10.00 | 10.00 | 10.00 |
| Cross-Linked Pea Starch | 30.00 | 30.00 | 30.00 | 30.00 | 30.00 |
| Methyl Cellulose A | 3.00 | 3.00 | 3.00 | 3.00 | 3.00 |
| Methyl Cellulose B | 1.50 | 1.50 | 1.50 | 1.50 | 1.50 |
| Tall Oil | 1.00 | 1.00 | 1.00 | 1.00 | 1.00 |
| Estimated Weight Percentages in Fired Ware | | | | | |
| MgO | 1.17 | 1.94 | 2.33 | 1.17 | 1.17 |
| $Al_2O_3$ | 53.90 | 51.72 | 50.64 | 53.87 | 53.71 |
| $SiO_2$ | 5.44 | 5.44 | 5.44 | 5.45 | 5.45 |
| $Fe_2O_3$ | 0.012 | 0.013 | 0.013 | 0.049 | 0.242 |
| $TiO_2$ | 35.99 | 37.37 | 38.05 | 35.99 | 35.96 |
| $Na_2O$ | 0.0270 | 0.0260 | 0.0254 | 0.0285 | 0.0284 |
| $K_2O$ | 0.0000 | 0.0000 | 0.0000 | 0.0000 | 0.0000 |
| CaO | 0.0232 | 0.0314 | 0.0356 | 0.0160 | 0.0160 |
| $ZrO_2$ | 2.91 | 2.92 | 2.93 | 2.90 | 2.90 |
| $CeO_2$ | 0.49 | 0.49 | 0.49 | 0.48 | 0.48 |
| Estimated Moles per 100 grams of Fired Ware | | | | | |
| MgO | 0.0289702 | 0.0482396 | 0.0578998 | 0.0289307 | 0.0289308 |
| $Al_2O_3$ | 0.5286254 | 0.5072957 | 0.4966388 | 0.5283805 | 0.5267892 |
| $SiO_2$ | 0.0906203 | 0.0906128 | 0.0906041 | 0.0906564 | 0.0906566 |
| $Fe_2O_3$ | 0.0000721 | 0.0000799 | 0.0000839 | 0.0003080 | 0.0015171 |
| $TiO_2$ | 0.4505860 | 0.4678666 | 0.4764873 | 0.4506260 | 0.4502428 |
| $Na_2O$ | 0.0004363 | 0.0004187 | 0.0004100 | 0.0004592 | 0.0004579 |
| $K_2O$ | 0.0000000 | 0.0000000 | 0.0000000 | 0.0000000 | 0.0000000 |
| CaO | 0.0004135 | 0.0005608 | 0.0006346 | 0.0002851 | 0.0002846 |
| $ZrO_2$ | 0.0236466 | 0.0237282 | 0.0237692 | 0.0235699 | 0.0235699 |
| $CeO_2$ | 0.0028214 | 0.0028312 | 0.0028361 | 0.0028123 | 0.0028123 |
| Total Moles per 100 grams of Fired Ware | 1.1262 | 1.1416 | 1.1494 | 1.1260 | 1.1253 |
| Estimated Mole Percentages in Fired Ware | | | | | |
| MgO | 2.57 | 4.23 | 5.04 | 2.57 | 2.57 |
| $Al_2O_3$ | 46.94 | 44.44 | 43.21 | 46.92 | 46.81 |
| $SiO_2$ | 8.05 | 7.94 | 7.88 | 8.05 | 8.06 |
| $Fe_2O_3$ | 0.01 | 0.01 | 0.01 | 0.03 | 0.13 |
| $TiO_2$ | 40.01 | 40.98 | 41.46 | 40.02 | 40.01 |
| $Na_2O$ | 0.04 | 0.04 | 0.04 | 0.04 | 0.04 |
| $K_2O$ | 0.00 | 0.00 | 0.00 | 0.00 | 0.00 |
| CaO | 0.04 | 0.05 | 0.06 | 0.03 | 0.03 |
| $ZrO_2$ | 2.10 | 2.08 | 2.07 | 2.09 | 2.09 |
| $CeO_2$ | 0.25 | 0.25 | 0.25 | 0.25 | 0.25 |

Exemplary Compositions S, T, and U of Table 5 comprise increasing amount of magnesium hydroxide raw material. These Exemplary Compositions all have about 3.00 wt % zirconia and about 0.50 wt % ceria as super addition in the batch compositions and about 2.91 to 2.93 wt % zirconia and about 0.48 to 0.49 wt % ceria in the fired wares.

Exemplary Compositions V and W of Table 5 comprise increasing amount of iron (III) oxide raw material. These Exemplary Compositions both have about 3.00 wt % zirconia and about 0.50 wt % ceria as super addition in the batch compositions and about 2.90 wt % zirconia and about 0.48 wt % ceria in the fired wares.

Table 6 provides firing conditions, phase composition, and physical properties of mullite-aluminum titanate (MAT) Comparative Examples 1, 2, 3, 4, and 5 having Comparative Compositions A, B, C, D, and E, respectively.

TABLE 6

| | Example Number | | | | |
|---|---|---|---|---|---|
| | 1 | 2 | 3 | 4 | 5 |
| Composition Number | A | B | C | D | E |
| Example Type | Comparative | Comparative | Comparative | Comparative | Comparative |
| Firing Cycle | | | | | |
| Heating Rate, 25-200° C. (° C./h) | 50 | 50 | 50 | 50 | 50 |
| Heating Rate, 200-350° C. (° C./h) | 50 | 50 | 50 | 50 | 50 |
| Heating Rate, 350-800° C. (° C./h) | 50 | 50 | 50 | 50 | 50 |
| Heating Rate, 800-950° C. (° C./h) | 50 | 50 | 50 | 50 | 50 |
| Heating Rate, 950° C. to Hold Temperature (° C./h) | 50 | 50 | 50 | 50 | 50 |
| Oxygen in Furnace Atmosphere | 21% | 21% | 21% | 21% | 21% |
| Hold Temperature ° C. | 1450 | 1450 | 1450 | 1450 | 1450 |
| Hold Time (h) | 15 | 15 | 15 | 15 | 15 |
| Cooling Rate (° C./h) | 200 | 200 | 200 | 200 | 200 |
| % Length Change (Dried to Fired) | −1.1 | −2.5 | −4.1 | −7.1 | −1.3 |
| % Diameter Change (Dried to Fired) | −1.1 | −3.2 | −4.4 | −6.5 | −0.6 |
| X-Ray Diffractometry Measurements | | | | | |
| wt % Pseudobrookite-Type Phase | 72.7 | 76.7 | 78.0 | 78.0 | 77.0 |
| wt % Corundum | 5.4 | 4.3 | 4.1 | 5.7 | 3.9 |
| wt % Rutile | 2.7 | 0.7 | 0.0 | 0.0 | 1.3 |
| wt % Mullite | 19.2 | 18.1 | 18.0 | 14.0 | 17.5 |
| wt % $CeO_2$ based phase | — | 0.2 | 0.6 | 1.8 | — |
| wt % $ZrO_2$ based phase | — | — | — | — | 0.3 |
| Pseudobrookite-Type Phase "a" Lattice Parameter (Å) | 9.455 | 9.452 | 9.450 | 9.447 | 9.461 |
| Pseudobrookite-Type Phase "b" Lattice Parameter (Å) | 9.667 | 9.663 | 9.661 | 9.658 | 9.678 |
| Pseudobrookite-Type Phase "c" Lattice Parameter (Å) | 3.597 | 3.596 | 3.596 | 3.595 | 3.595 |
| Pseudobrookite-Type Phase Unit Cell Volume (Å$^3$) | 328.7 | 328.4 | 328.2 | 328.0 | 329.2 |
| Composition of Tialite Phase (Cations per 5 Oxygens) | | | | | |
| Zr (4+) | 0.000 | 0.000 | — | — | 0.017 |
| Al (3+) | 1.867 | 1.875 | — | — | 1.871 |
| Ti (4+) | 1.053 | 1.051 | — | — | 1.035 |
| Fe (3+) | 0.0031 | 0.0027 | — | — | 0.0030 |
| Mg (2+) | 0.065 | 0.062 | — | — | 0.063 |
| Si (4+) | 0.012 | 0.009 | — | — | 0.011 |
| Physical Properties | | | | | |
| % Porosity | 60.8 | 61.7 | 58.9 | 52.8 | 63.6 |
| $d_{10}$ (μm) | 11.4 | 14.8 | 16.8 | 18.2 | 12.7 |
| $d_{50}$ (μm) | 15.8 | 17.9 | 19.9 | 21.3 | 16.4 |
| $d_{90}$ (μm) | 16.9 | 18.7 | 23.5 | 26.3 | 17.6 |
| $(d_{50} - d_{10})/d_{50}$ | 0.27 | 0.17 | 0.15 | 0.14 | 0.22 |
| $(d_{90} - d_{50})/d_{50}$ | 0.07 | 0.05 | 0.18 | 0.23 | 0.08 |
| $(d_{90} - d_{10})/d_{50}$ | 0.35 | 0.22 | 0.34 | 0.38 | 0.30 |
| $CTE_{RT-1000° C.}$ ($10^{-7}$ °$C.^{-1}$) | 28.3 | 19.9 | 11.6 | 8.7 | 23.1 |
| $CTE_{RT-800° C.}$ ($10^{-7}$ °$C.^{-1}$) | 25.3 | 16.9 | 8.5 | 4.6 | 20.1 |
| $CTE_{500-1000° C.}$ ($10^{-7}$ °$C.^{-1}$) | 37.3 | 30.2 | 22.2 | 20.6 | 32.2 |
| $CTE_{1000-600° C.}$ ($10^{-7}$ °$C.^{-1}$) | 55.3 | 55.7 | 47.7 | 42.8 | 56.2 |
| MOR (psi) | 292 | 339 | 187 | 170 | 260 |
| Elastic Modulus (psi) | 2.22E+05 | 2.68E+05 | 1.64E+05 | 1.64E+05 | 1.85E+05 |
| MOR/E at 25° C. ($10^{-2}$) | 0.131 | 0.127 | 0.114 | 0.104 | 0.141 |
| $TSL_{Down}$ (° C.) = 600 + (MOR/E)/$CTE_{1000-600° C.}$ | 838 | 827 | 839 | 842 | 851 |
| $TSL_{Up}$ (° C.) = 500 + (MOR/E)/$CTE_{500-1000° C.}$ | 853 | 919 | 1013 | 1003 | 936 |

Table 7 provides firing conditions, phase composition, and physical properties of mullite-aluminum titanate (MAT) Exemplary Examples 6, 7, 8, and 9 having Exemplary Compositions F, G, H, and I, respectively. Table 8 provides firing conditions, phase composition, and physical properties of MAT Exemplary Examples 10, 11, and 12 having Exemplary Compositions K, G, and L, respectively.

TABLE 7

| | Example Number | | | |
|---|---|---|---|---|
| | 6 | 7 | 8 | 9 |
| Composition Number | F | G | H | I |
| Example Type | Exemplary | Exemplary | Exemplary | Exemplary |
| Firing Cycle | | | | |
| Heating Rate, 25-200° C. (° C./h) | 50 | 150 | 150 | 150 |
| Heating Rate, 200-350° C. (° C./h) | 50 | 90 | 90 | 90 |
| Heating Rate, 350-800° C. (° C./h) | 50 | 150 | 150 | 150 |
| Heating Rate, 800-950° C. (° C./h) | 50 | 30 | 30 | 30 |

TABLE 7-continued

|  | Example Number | | | |
|---|---|---|---|---|
|  | 6 | 7 | 8 | 9 |
| Heating Rate, 950° C. to Hold Temperature (° C./h) | 50 | 75 | 75 | 75 |
| Oxygen in Furnace Atmosphere | 21% | 2% to 700 C. | 2% to 700 C. | 2% to 700 C. |
| Hold Temperature ° C. | 1450 | 1450 | 1450 | 1450 |
| Hold Time (h) | 15 | 15 | 15 | 15 |
| Cooling Rate (° C./h) | 200 | 150 | 150 | 150 |
| % Length Change (Dried to Fired) | −2.5 | −3.9 | −4.1 | −3.6 |
| % Diameter Change (Dried to Fired) | −2.7 | −4.3 | −4.4 | −3.7 |
| X-Ray Diffractometry Measurements | | | | |
| wt % Pseudobrookite-Type Phase | 77.5 | 78.4 | 75.8 | 73.0 |
| wt % Corundum | 3.9 | 2.4 | 2.5 | 3.0 |
| wt % Rutile | 0.9 | 0.2 | 0.2 | 0.0 |
| wt % Mullite | 17.1 | 17.7 | 17.7 | 16.7 |
| wt % $CeO_2$ based phase | 0.4 | 0.0 | 0.0 | 0.0 |
| wt % $ZrO_2$ based phase | 0.2 | 1.2 | 3.7 | 6.9 |
| Pseudobrookite-Type Phase "a" Lattice Parameter (Å) | 9.458 | 9.456 | 9.456 | 9.457 |
| Pseudobrookite-Type Phase "b" Lattice Parameter (Å) | 9.675 | 9.674 | 9.675 | 9.676 |
| Pseudobrookite-Type Phase "c" Lattice Parameter (Å) | 3.595 | 3.594 | 3.594 | 3.594 |
| Pseudobrookite-Type Phase Unit Cell Volume (Å$^3$) | 329.0 | 328.8 | 328.8 | 328.8 |
| Composition of Tialite Phase (Cations per 5 Oxygens) | | | | |
| Zr (4+) |  | 0.016 | 0.020 | 0.020 | 0.021 |
| Al (3+) | 1.886 | 1.902 | 1.904 | 1.900 |
| Ti (4+) | 1.030 | 1.015 | 1.015 | 1.017 |
| Fe (3+) | 0.0029 | 0.0027 | 0.0027 | 0.0028 |
| Mg (2+) | 0.056 | 0.048 | 0.048 | 0.049 |
| Si (4+) | 0.010 | 0.012 | 0.011 | 0.011 |
| Physical Properties | | | | |
| % Porosity | 60.4 | 58.5 | 63.7 | 59.0 |
| $d_{10}$ (μm) | 16.7 | 17.0 | 17.2 | 15.9 |
| $d_{50}$ (μm) | 19.5 | 19.5 | 19.5 | 18.2 |
| $d_{90}$ (μm) | 20.4 | 24.4 | 22.2 | 21.8 |
| $(d_{50} - d_{10})/d_{50}$ | 0.15 | 0.13 | 0.12 | 0.12 |
| $(d_{90} - d_{50})/d_{50}$ | 0.05 | 0.25 | 0.14 | 0.20 |
| $(d_{90} - d_{10})/d_{50}$ | 0.19 | 0.38 | 0.26 | 0.32 |
| $CTE_{RT-1000° C.}$ ($10^{-7}$ ° C.$^{-1}$) | 14.1 | 11.8 | 12.9 | 11.4 |
| $CTE_{RT-800° C.}$ ($10^{-7}$ ° C.$^{-1}$) | 10.7 | 7.5 | 7.8 | 4.8 |
| $CTE_{500-1000° C.}$ ($10^{-7}$ ° C.$^{-1}$) | 24.2 | 20.0 | 17.3 | 8.9 |
| $CTE_{1000-600° C.}$ ($10^{-7}$ ° C.$^{-1}$) | 52.7 | 50.3 | 49.9 | 42.8 |
| MOR (psi) | 323 | 163 | 174 | 203 |
| Elastic Modulus (psi) | 2.27E+05 | 1.32E+05 | 1.45E+05 | 1.67E+05 |
| MOR/E at 25° C. ($10^{-2}$) | 0.142 | 0.124 | 0.120 | 0.122 |
| $TSL_{Down}$ (° C.) = 600 + (MOR/E)/$CTE_{1000-600° C.}$ | 870 | 846 | 841 | 884 |
| $TSL_{Up}$ (° C.) = 500 + (MOR/E)/$CTE_{500-1000° C.}$ | 1088 | 1119 | 1196 | 1860 |

TABLE 8

|  | Example Number | | |
|---|---|---|---|
|  | 10 | 11 | 12 |
| Composition Number | K | G | L |
| Example Type | Exemplary | Exemplary | Exemplary |
| Firing Cycle | | | |
| Heating Rate, 25-200° C. (° C./h) | 150 | 150 | 150 |
| Heating Rate, 200-350° C. (° C./h) | 90 | 90 | 90 |
| Heating Rate, 350-800° C. (° C./h) | 150 | 150 | 150 |
| Heating Rate, 800-950° C. (° C./h) | 30 | 30 | 30 |
| Heating Rate, 950° C. to Hold Temperature (° C./h) | 75 | 75 | 75 |
| Oxygen in Furnace Atmosphere | 2% to 700 C. | 2% to 700 C. | 2% to 700 C. |
| Hold Temperature ° C. | 1450 | 1450 | 1450 |
| Hold Time (h) | 15 | 15 | 15 |
| Cooling Rate (° C./h) | 150 | 150 | 150 |
| % Length Change (Dried to Fired) | −6.2 | −3.9 | −2.9 |
| % Diameter Change (Dried to Fired) | −6.3 | −4.3 | −3.1 |
| X-Ray Diffractometry Measurements | | | |
| wt % Pseudobrookite-Type Phase | 92.0 | 78.4 | 65.5 |
| wt % Corundum | 3.4 | 2.4 | 1.7 |
| wt % Rutile | 0.0 | 0.2 | 0.3 |
| wt % Mullite | 3.1 | 17.7 | 31.0 |

TABLE 8-continued

|  | Example Number | | |
|---|---|---|---|
|  | 10 | 11 | 12 |
| wt % CeO$_2$ based phase | 0.3 | 0.0 | 0.0 |
| wt % ZrO$_2$ based phase | 1.2 | 1.2 | 1.2 |
| Pseudobrookite-Type Phase "a" Lattice Parameter (Å) | 9.457 | 9.456 | 9.456 |
| Pseudobrookite-Type Phase "b" Lattice Parameter (Å) | 9.675 | 9.674 | 9.674 |
| Pseudobrookite-Type Phase "c" Lattice Parameter (Å) | 3.595 | 3.594 | 3.593 |
| Pseudobrookite-Type Phase Unit Cell Volume (Å$^3$) | 328.9 | 328.8 | 328.7 |
| Composition of Tialite Phase (Cations per 5 Oxygens) | | | |
| Zr (4+) | 0.021 | 0.020 | 0.020 |
| Al (3+) | 1.892 | 1.902 | 1.911 |
| Ti (4+) | 1.022 | 1.015 | 1.011 |
| Fe (3+) | 0.0028 | 0.0027 | 0.0028 |
| Mg (2+) | 0.053 | 0.048 | 0.045 |
| Si (4+) | 0.010 | 0.012 | 0.011 |
| Physical Properties | | | |
| % Porosity | 55.8 | 58.5 | 60.1 |
| d$_{10}$ (μm) | 18.3 | 17.0 | 16.4 |
| d$_{50}$ (μm) | 20.6 | 19.5 | 19.2 |
| d$_{90}$ (μm) | 25.9 | 24.4 | 24.0 |
| (d$_{50}$ − d$_{10}$)/d$_{50}$ | 0.11 | 0.13 | 0.14 |
| (d$_{90}$ − d$_{50}$)/d$_{50}$ | 0.26 | 0.25 | 0.25 |
| (d$_{90}$ − d$_{10}$)/d$_{50}$ | 0.37 | 0.38 | 0.39 |
| CTE$_{RT-1000°\ C.}$ ($10^{-7}\ °C.^{-1}$) | 10.6 | 11.8 | 15.3 |
| CTE$_{RT-800°\ C.}$ ($10^{-7}\ °C.^{-1}$) | 5.5 | 7.5 | 11.8 |
| CTE$_{500-1000°\ C.}$ ($10^{-7}\ °C.^{-1}$) | 19.8 | 20.0 | 21.7 |
| CTE$_{1000-600°\ C.}$ ($10^{-7}\ °C.^{-1}$) | 55.8 | 50.3 | 47.0 |
| MOR (psi) | 175 | 163 | 160 |
| Elastic Modulus (psi) | 1.29E+05 | 1.32E+05 | 1.32E+05 |
| MOR/E at 25° C. ($10^{-2}$) | 0.135 | 0.124 | 0.121 |
| TSL$_{Down}$ (° C.) = 600 + (MOR/E)/CTE$_{1000-600°\ C.}$ | 843 | 846 | 858 |
| TSL$_{Up}$ (° C.) = 500 + (MOR/E)/CTE$_{500-1000°\ C.}$ | 1182 | 1119 | 1059 |

Table 9 provides firing conditions, phase composition, and physical properties of MAT Exemplary Examples 14, 15, 16, and 17 having Exemplary Compositions N, O, P, and Q respectively.

TABLE 9

|  | Example Number | | | |
|---|---|---|---|---|
|  | 14 | 15 | 16 | 17 |
| Composition Number | N | O | P | Q |
| Example Type | Exemplary | Exemplary | Exemplary | Exemplary |
| Firing Cycle | | | | |
| Heating Rate, 25-200° C. (° C./h) | 150 | 150 | 150 | 150 |
| Heating Rate, 200-350° C. (° C./h) | 90 | 90 | 90 | 90 |
| Heating Rate, 350-800° C. (° C./h) | 150 | 150 | 150 | 150 |
| Heating Rate, 800-950° C. (° C./h) | 30 | 30 | 30 | 30 |
| Heating Rate, 950° C. to Hold Temperature (° C./h) | 75 | 75 | 75 | 75 |
| Oxygen in Furnace Atmosphere | 2% to 700 C. | 2% to 700 C. | 2% to 700 C. | 2% to 700 C. |
| Hold Temperature ° C. | 1450 | 1450 | 1450 | 1450 |
| Hold Time (h) | 15 | 15 | 15 | 15 |
| Cooling Rate (° C./h) | 150 | 150 | 150 | 150 |
| % Length Change (Dried to Fired) | −4.1 | −4.2 | −4.0 | −3.7 |
| % Diameter Change (Dried to Fired) | — | — | — | — |
| X-Ray Diffractometry Measurements | | | | |
| wt % Pseudobrookite-Type Phase | 71.8 | 66.2 | 76.9 | 74.3 |
| wt % Corundum | 1.1 | 0.9 | 2.5 | 3.0 |
| wt % Rutile | 0.9 | 1.5 | 0.2 | 0.1 |
| wt % Mullite | 24.7 | 26.8 | 19.1 | 18.3 |
| wt % ZrTiO$_4$ | 0.8 | 2.7 | 0.2 | 0.5 |
| wt % ZrO$_2$ based phase | 0.8 | 1.9 | 1.2 | 3.8 |
| Pseudobrookite-Type Phase "a" Lattice Parameter (Å) | 9.454 | 9.453 | 9.455 | 9.457 |
| Pseudobrookite-Type Phase "b" Lattice Parameter (Å) | 9.672 | 9.671 | 9.673 | 9.675 |
| Pseudobrookite-Type Phase "c" Lattice Parameter (Å) | 3.594 | 3.593 | 3.594 | 3.594 |
| Pseudobrookite-Type Phase Unit Cell Volume (Å$^3$) | 328.6 | 328.4 | 328.7 | 328.8 |

TABLE 9-continued

|  | Example Number | | | |
|---|---|---|---|---|
|  | 14 | 15 | 16 | 17 |
| Physical Properties | | | | |
| % Porosity | 57.3 | 55.2 | 57.3 | 56.9 |
| $d_{10}$ (μm) | 16.9 | 17.2 | 16.6 | 16.3 |
| $d_{50}$ (μm) | 19.5 | 19.8 | 18.9 | 18.3 |
| $d_{90}$ (μm) | 24.3 | 25.1 | 22.7 | 21.1 |
| $(d_{50} - d_{10})/d_{50}$ | 0.13 | 0.13 | 0.12 | 0.11 |
| $(d_{90} - d_{50})/d_{50}$ | 0.25 | 0.27 | 0.20 | 0.15 |
| $(d_{90} - d_{10})/d_{50}$ | 0.38 | 0.40 | 0.32 | 0.26 |
| $CTE_{RT-1000°\ C.}$ $(10^{-7}\ °C.^{-1})$ | 12.6 | 13.3 | 12.0 | 11.8 |
| $CTE_{RT-800°\ C.}$ $(10^{-7}\ °C.^{-1})$ | 8.3 | 8.5 | 7.8 | 6.5 |
| $CTE_{500-1000°\ C.}$ $(10^{-7}\ °C.^{-1})$ | 22.4 | 25.0 | 20.1 | 14.5 |
| $CTE_{1000-600°\ C.}$ $(10^{-7}\ °C.^{-1})$ | 51.4 | 52.9 | 54.4 | 46.3 |
| MOR (psi) | 160 | 192 | 165 | 202 |
| Elastic Modulus (psi) | 1.41E+05 | 1.69E+05 | 1.40E+05 | 1.79E+05 |
| MOR/E at 25° C. $(10^{-2})$ | 0.113 | 0.114 | 0.118 | 0.113 |
| $TSL_{Down}$ (° C.) = 600 + (MOR/E)/$CTE_{1000-600°\ C.}$ | 821 | 815 | 816 | 844 |
| $TSL_{Up}$ (° C.) = 500 + (MOR/E)/$CTE_{500-1000°\ C.}$ | 1006 | 955 | 1085 | 1280 |

Table 10 provides firing conditions, phase composition, and physical properties of MAT Exemplary Examples 19, 20, 21, 22, and 23 having Exemplary Compositions S, T, U, V, and W, respectively.

TABLE 10

|  | Example Number | | | | |
|---|---|---|---|---|---|
|  | 19 | 20 | 21 | 22 | 23 |
| Composition Number | S | T | U | V | W |
| Example Type | Exemplary | Exemplary | Exemplary | Exemplary | Exemplary |
| Firing Cycle | | | | | |
| Heating Rate, 25-200° C. (° C./h) | 150 | 150 | 150 | 150 | 150 |
| Heating Rate, 200-350° C. (° C./h) | 90 | 90 | 90 | 90 | 90 |
| Heating Rate, 350-800° C. (° C./h) | 150 | 150 | 150 | 150 | 150 |
| Heating Rate, 800-950° C. (° C./h) | 30 | 30 | 30 | 30 | 30 |
| Heating Rate, 950° C. to Hold Temperature (° C./h) | 75 | 75 | 75 | 75 | 75 |
| Oxygen in Furnace Atmosphere | 2% to 700 C. | 2% to 700 C. | 2% to 700 C. | 2% to 700 C. | 2% to 700 C. |
| Hold Temperature ° C. | 1450 | 1450 | 1450 | 1450 | 1450 |
| Hold Time (h) | 15 | 15 | 15 | 15 | 15 |
| Cooling Rate (° C./h) | 150 | 150 | 150 | 150 | 150 |
| % Length Change (Dried to Fired) | −7.6 | −14.7 | −16.8 | −3.8 | −6.2 |
| % Diameter Change (Dried to Fired) | — | — | — | −4.8 | −8.2 |
| X-Ray Diffractometry Measurements | | | | | |
| wt % Pseudobrookite-Type Phase | 80.2 | 82.1 | 80.7 | 82.1 | 81.0 |
| wt % Corundum | 2.6 | 1.8 | 2.0 | 5.6 | 3.6 |
| wt % Rutile | 0.2 | 0.0 | 0.0 | 0.0 | 0.0 |
| wt % Mullite | 15.8 | 14.9 | 15.7 | 10.6 | 13.8 |
| wt % $ZrTiO_4$ | trace | 0.0 | 0.0 | 0.0 | 0.0 |
| wt % $CeO_2$ based phase | 0.0 | 0.3 | 0.4 | 0.4 | 0.4 |
| wt % $ZrO_2$ based phase | 1.2 | 0.9 | 1.1 | 1.3 | 1.2 |
| Pseudobrookite-Type Phase "a" Lattice Parameter (Å) | 9.454 | 9.464 | 9.475 | 9.456 | 9.458 |
| Pseudobrookite-Type Phase "b" Lattice Parameter (Å) | 9.674 | 9.686 | 9.696 | 9.675 | 9.677 |
| Pseudobrookite-Type Phase "c" Lattice Parameter (Å) | 3.594 | 3.597 | 3.600 | 3.594 | 3.594 |
| Pseudobrookite-Type Phase Unit Cell Volume (Å$^3$) | 328.7 | 329.7 | 330.7 | 328.8 | 329.0 |
| Physical Properties | | | | | |
| % Porosity | 52.9 | 45.3 | 36.9 | 54.6 | 55.4 |
| $d_{10}$ (μm) | 15.2 | 13.8 | 13.0 | 15.2 | 14.5 |
| $d_{50}$ (μm) | 18.1 | 16.7 | 15.6 | 17.3 | 16.9 |
| $d_{90}$ (μm) | 22.9 | 22.3 | 21.8 | 19.4 | 18.7 |
| $(d_{50} - d_{10})/d_{50}$ | 0.16 | 0.17 | 0.17 | 0.12 | 0.14 |
| $(d_{90} - d_{50})/d_{50}$ | 0.27 | 0.33 | 0.40 | 0.12 | 0.11 |
| $(d_{90} - d_{10})/d_{50}$ | 0.43 | 0.50 | 0.57 | 0.24 | 0.25 |
| $CTE_{RT-1000°\ C.}$ $(10^{-7}\ °C.^{-1})$ | 9.6 | −0.5 | −2.2 | 13.6 | 9.4 |
| $CTE_{RT-800°\ C.}$ $(10^{-7}\ °C.^{-1})$ | 5.0 | −5.4 | −7.6 | 9.3 | 4.9 |
| $CTE_{500-1000°\ C.}$ $(10^{-7}\ °C.^{-1})$ | 17.6 | 7.4 | 6.4 | 22.8 | 17.6 |
| $CTE_{1000-600°\ C.}$ $(10^{-7}\ °C.^{-1})$ | 53.2 | 43.1 | 47.2 | 57.6 | 54.7 |
| MOR (psi) | 217 | — | — | 515 | 657 |
| Elastic Modulus (psi) | 1.96E+05 | — | — | 3.62E+05 | 4.82E+05 |

TABLE 10-continued

|  | Example Number | | | | |
|---|---|---|---|---|---|
|  | 19 | 20 | 21 | 22 | 23 |
| MOR/E at 25° C. ($10^{-2}$) | 0.111 | — | — | 0.142 | 0.136 |
| $TSL_{Down}$ (° C.) = 600 + (MOR/E)/$CTE_{1000-600° C.}$ | 809 | — | — | 847 | 849 |
| $TSL_{Up}$ (° C.) = 500 + (MOR/E)/$CTE_{500-1000° C.}$ | 1130 | — | — | 1124 | 1276 |

Table 11 provides raw materials and estimated bulk compositions of cordierite-mullite-aluminum titanate (GMAT) Comparative Compositions Y and Z and of GMAT Exemplary Compositions AA, AB, and AC.

TABLE 11

|  | Composition Number | | | | |
|---|---|---|---|---|---|
|  | Y | Z | AA | AB | AC |
| Batch Code | Comparative | Comparative | Exemplary | Exemplary | Exemplary |
| Raw Materials | | | | | |
| Aluminum Oxide | 41.71 | 41.14 | 41.42 | 40.95 | 41.40 |
| Titanium Oxide | 33.09 | 32.64 | 32.86 | 32.49 | 32.85 |
| Quartz | 3.01 | 2.97 | 2.99 | 2.95 | 2.28 |
| Talc | 20.74 | 20.46 | 20.59 | 20.36 | 20.59 |
| Zirconium Oxide | — | 2.80 | 1.42 | 2.77 | — |
| Zirconium Silicate | — | — | — | — | 2.15 |
| Cerium Oxide | 1.46 | — | 0.73 | 0.48 | 0.73 |
| Graphite | 10.00 | 10.00 | 10.00 | 10.00 | 10.00 |
| Cross-Linked Pea Starch | 28.00 | 28.00 | 28.00 | 28.00 | 28.00 |
| Methyl Cellulose A | 3.00 | 3.00 | 3.00 | 3.00 | 3.00 |
| Methyl Cellulose B | 1.50 | 1.50 | 1.50 | 1.50 | 1.50 |
| Tall Oil | 1.00 | 1.00 | 1.00 | 1.00 | 1.00 |
| Estimated Weight Percentages in Fired Ware | | | | | |
| MgO | 6.61 | 6.52 | 6.56 | 6.49 | 6.56 |
| $Al_2O_3$ | 42.27 | 41.68 | 41.97 | 41.49 | 41.97 |
| $SiO_2$ | 15.85 | 15.63 | 15.74 | 15.55 | 15.74 |
| $Fe_2O_3$ | 0.222 | 0.219 | 0.221 | 0.218 | 0.221 |
| $TiO_2$ | 33.47 | 33.01 | 33.23 | 32.86 | 33.23 |
| $Na_2O$ | 0.03 | 0.029 | 0.029 | 0.029 | 0.029 |
| $K_2O$ | 0 | 0 | 0 | 0 | 0 |
| CaO | 0.042 | 0.041 | 0.041 | 0.041 | 0.041 |
| $ZrO_2$ | 0 | 2.83 | 1.44 | 2.8 | 1.44 |
| $CeO_2$ | 1.48 | 0 | 0.73 | 0.48 | 0.73 |
| Estimated Moles per 100 grams of Fired Ware | | | | | |
| MgO | 0.1640242 | 0.1617854 | 0.1628314 | 0.1609973 | 0.1628314 |
| $Al_2O_3$ | 0.4145583 | 0.4088316 | 0.4116589 | 0.4069498 | 0.4116589 |
| $SiO_2$ | 0.2637794 | 0.2601896 | 0.2618908 | 0.2588301 | 0.2618908 |
| $Fe_2O_3$ | 0.0013921 | 0.0013731 | 0.001382 | 0.0013664 | 0.001382 |
| $TiO_2$ | 0.4190525 | 0.4132913 | 0.4161229 | 0.4113989 | 0.4161229 |
| $Na_2O$ | 0.0004766 | 0.00047 | 0.0004732 | 0.0004678 | 0.0004732 |
| $K_2O$ | 0 | 0 | 0 | 0 | 0 |
| CaO | 0.0007429 | 0.0007327 | 0.0007375 | 0.0007292 | 0.0007375 |
| $ZrO_2$ | 0 | 0.0229722 | 0.0116518 | 0.0227593 | 0.0116518 |
| $CeO_2$ | 0.0085768 | 0 | 0.0042647 | 0.0028135 | 0.0042647 |
| Total Moles per 100 grams of Fired Ware | 1.2726 | 1.2696 | 1.271 | 1.2663 | 1.271 |
| Estimated Mole Percentages in Fired Ware | | | | | |
| MgO | 12.89 | 12.74 | 12.81 | 12.71 | 12.81 |
| $Al_2O_3$ | 32.58 | 32.2 | 32.39 | 32.14 | 32.39 |
| $SiO_2$ | 20.73 | 20.49 | 20.6 | 20.44 | 20.6 |
| $Fe_2O_3$ | 0.11 | 0.11 | 0.11 | 0.11 | 0.11 |
| $TiO_2$ | 32.93 | 32.55 | 32.74 | 32.49 | 32.74 |
| $Na_2O$ | 0.04 | 0.04 | 0.04 | 0.04 | 0.04 |
| $K_2O$ | 0 | 0 | 0 | 0 | 0 |
| CaO | 0.06 | 0.06 | 0.06 | 0.06 | 0.06 |

TABLE 11-continued

| | Composition Number | | | | |
|---|---|---|---|---|---|
| | Y | Z | AA | AB | AC |
| $ZrO_2$ | 0 | 1.81 | 0.92 | 1.8 | 0.92 |
| $CeO_2$ | 0.67 | 0 | 0.34 | 0.22 | 0.34 |

Table 12 provides firing conditions, phase composition, and physical properties of GMAT Comparative Examples 25 and 26 having Comparative Compositions Y and Z, respectively. Table 12 also provides firing conditions, phase composition, and physical properties of GMAT Exemplary Examples 27 and 28 having Exemplary Compositions AA and AB, respectively.

TABLE 12

| | Example Number | | | |
|---|---|---|---|---|
| | 25 | 26 | 27 | 28 |
| Composition Number | Y | Z | AA | AB |
| Example Type | Comparative | Comparative | Exemplary | Exemplary |
| Firing Cycle | | | | |
| Heating Rate, 25-200° C. (° C./h) | 150 | 150 | 150 | 150 |
| Heating Rate, 200-350° C. (° C./h) | 90 | 90 | 90 | 90 |
| Heating Rate, 350-800° C. (° C./h) | 150 | 150 | 150 | 150 |
| Heating Rate, 800-950° C. (° C./h) | 75 | 75 | 75 | 75 |
| Heating Rate, 950° C. to Hold Temperature (° C./h) | 75 | 75 | 75 | 75 |
| Oxygen in Furnace Atmosphere | 3% to 800° C. | 3% to 800° C. | 3% to 800° C. | 3% to 800° C. |
| Hold Temperature ° C. | 1354 | 1354 | 1354 | 1354 |
| Hold Time (h) | 22 | 22 | 22 | 22 |
| Cooling Rate (° C./h) | 150 | 150 | 150 | 150 |
| % Diameter Change (Mask to Fired) | 3.53 | 1.20 | 3.50 | 2.59 |
| X-Ray Diffractometry Measurements | | | | |
| wt % Pseudobrookite-Type Phase | 67.35 | 67.22 | 68.17 | 67.18 |
| wt % Cordierite | 20.21 | 19.58 | 20.5 | 19.12 |
| wt % Corundum | 2.37 | 3.67 | 2.06 | 2.56 |
| wt % Rutile | 0 | 0.53 | 0.29 | 0 |
| wt % Mullite | 8.25 | 5.95 | 8.97 | 8.13 |
| wt % $ZrSiO_4$ | 0 | 3.05 | 0 | 3.01 |
| wt % $Ce_2Ti_2O_6$ | 1.82 | 0 | 0 | 0 |
| Pseudobrookite-Type Phase "a" Lattice Parameter (Å) | 9.5073 | 9.5222 | 9.5153 | 9.5198 |
| Pseudobrookite-Type Phase "b" Lattice Parameter (Å) | 9.7272 | 9.7487 | 9.74069 | 9.7465 |
| Pseudobrookite-Type Phase "c" Lattice Parameter (Å) | 3.6164 | 3.6165 | 3.6159 | 3.6166 |
| Pseudobrookite-Type Phase Unit Cell Volume (Å$^3$) | 334.44 | 335.72 | 335.14 | 335.57 |
| Physical Properties | | | | |
| % Porosity | 58.8 | 62.6 | 59.1 | 60.7 |
| $d_{10}$ (μm) | 15.3 | 12.1 | 15.7 | 14 |
| $d_{50}$ (μm) | 18.4 | 16.3 | 19 | 17.2 |
| $d_{90}$ (μm) | 23.5 | 21 | 23.4 | 20.6 |
| $(d_{50} - d_{10})/d_{50}$ | 0.17 | 0.26 | 0.17 | 0.19 |
| $(d_{90} - d_{50})/d_{50}$ | 0.28 | 0.29 | 0.23 | 0.20 |
| $(d_{90} - d_{10})/d_{50}$ | 0.45 | 0.55 | 0.41 | 0.38 |
| $CTE_{RT-1000° C.}$ ($10^{-7}$ ° $C.^{-1}$) | 10.8 | 18.8 | 11.1 | 12.8 |
| $CTE_{RT-800° C.}$ ($10^{-7}$ ° $C.^{-1}$) | 7.7 | 14.9 | 7.8 | 9.4 |
| $CTE_{500-1000° C.}$ ($10^{-7}$ ° $C.^{-1}$) | 18.3 | 27.6 | 19.0 | 20.9 |
| $CTE_{1000-600° C.}$ ($10^{-7}$ ° $C.^{-1}$) | 37.2 | 43.5 | 38.4 | 39.5 |
| MOR (psi) | 223 | 190 | — | — |
| Elastic Modulus (psi) | 2.24E+05 | 1.94E+05 | — | — |
| MOR/E at 25° C. ($10^{-2}$) | 0.099 | 0.098 | — | — |
| $TSL_{Down}$ (° C.) = 600 + (MOR/E)/$CTE_{1000-600° C.}$ | 867 | 825 | — | — |
| $TSL_{Up}$ (° C.) = 500 + (MOR/E)/$CTE_{500-1000° C.}$ | 1043 | 854 | — | — |

Table 13 provides firing conditions, phase composition, and physical properties of GMAT Comparative Examples 29 and 30, having Comparative Compositions Y and Z, respectively, at 60° C./h heating rate between 800-950° C. Table 13 also provides firing conditions, phase composition, and physical properties of GMAT Exemplary Examples 31 and 32 having Exemplary Compositions AA and AB, respectively, at 60° C./h heating rate between 800-950° C., as well as Exemplary Examples 33 and 34 corresponding to Exemplary Compositions AA and AC, respectively, at 30° C./h heating rate between 800-950° C.

TABLE 13

| | Example Number | | | | | |
|---|---|---|---|---|---|---|
| | 29 | 30 | 31 | 32 | 33 | 34 |
| Composition Number | Y | Z | AA | AB | AA | AC |
| Example Type | Comparative | Comparative | Exemplary | Exemplary | Exemplary | Exemplary |
| Firing Cycle | | | | | | |
| Heating Rate, 25-200° C. (° C./h) | 150 | 150 | 150 | 150 | 150 | 150 |
| Heating Rate, 200-350° C. (° C./h) | 90 | 90 | 90 | 90 | 90 | 90 |
| Heating Rate, 350-800° C. (° C./h) | 150 | 150 | 150 | 150 | 150 | 150 |
| Heating Rate, 800-950° C. (° C./h) | 60 | 60 | 60 | 60 | 30 | 30 |
| Heating Rate, 950° C. to Hold Temperature (° C./h) | 75 | 75 | 75 | 75 | 75 | 75 |
| Oxygen in Furnace Atmosphere | 3% to 800° C. | 3% to 800° C. | 3% to 800° C. | 3% to 800° C. | 3% to 800° C. | 3% to 800° C. |
| Hold Temperature ° C. | 1345 | 1345 | 1345 | 1345 | 1349 | 1349 |
| Hold Time (h) | 22 | 22 | 22 | 22 | 22 | 22 |
| Cooling Rate (° C./h) | 150 | 150 | 150 | 150 | 150 | 150 |
| % Diameter Change (Mask to Fired) | 3.57 | 1.18 | 2.72 | 2.02 | 2.89 | 2.82 |
| X-Ray Diffractometry Measurements | | | | | | |
| wt % Pseudobrookite-Type Phase | 67.04 | 62.74 | 67.62 | 66.29 | 66.4 | 67.3 |
| wt % Cordierite | 20.89 | 20.68 | 21.27 | 19.82 | 20.61 | 20.68 |
| wt % Corundum | 2.89 | 5.42 | 2.77 | 3.35 | 2.58 | 2.89 |
| wt % Rutile | 0 | 1.53 | 0.63 | 0.4 | 0.29 | 0.81 |
| wt % Mullite | 7.26 | 6.28 | 7.71 | 6.94 | 9.08 | 7.2 |
| wt % ZrSiO$_4$ | 0 | 3.34 | 0 | 3.21 | 0 | 0 |
| wt % Ce$_2$Ti$_2$O$_6$ | 1.92 | 0 | 0 | 0 | 1.02 | 1.13 |
| Pseudobrookite-Type Phase "a" Lattice Parameter (Å) | 9.5078 | 9.5254 | 9.5165 | 9.5206 | 9.5166 | 9.518 |
| Pseudobrookite-Type Phase "b" Lattice Parameter (Å) | 9.7281 | 9.7537 | 9.7419 | 9.7474 | 9.7424 | 9.7446 |
| Pseudobrookite-Type Phase "c" Lattice Parameter (Å) | 3.6166 | 3.6175 | 3.6157 | 3.6169 | 3.616 | 3.6169 |
| Pseudobrookite-Type Phase Unit Cell Volume (Å$^3$) | 334.51 | 336.09 | 335.21 | 335.65 | 335.26 | 335.46 |
| Physical Properties | | | | | | |
| % Porosity | 59.3 | 62.6 | 60.5 | 61.9 | 60.3 | 60.3 |
| $d_{10}$ (μm) | 14.5 | 10.9 | 14.6 | 13.2 | — | — |
| $d_{50}$ (μm) | 17.7 | 14.8 | 17.8 | 17.2 | — | — |
| $d_{90}$ (μm) | 21.3 | 18.8 | 21.4 | 20.9 | — | — |
| $(d_{50} - d_{10})/d_{50}$ | 0.18 | 0.26 | 0.18 | 0.23 | — | — |
| $(d_{90} - d_{50})/d_{50}$ | 0.20 | 0.27 | 0.20 | 0.22 | — | — |
| $(d_{90} - d_{10})/d_{50}$ | 0.38 | 0.53 | 0.38 | 0.45 | — | — |
| $CTE_{RT-1000° C.}$ ($10^{-7°}$ C.$^{-1}$) | 10.6 | 20.8 | 11.9 | 14.5 | 11.6 | 11.2 |
| $CTE_{RT-800° C.}$ ($10^{-7°}$ C.$^{-1}$) | 7.4 | 17.1 | 8.4 | 11.0 | 8.5 | 8.1 |
| $CTE_{500-1000° C.}$ ($10^{-7°}$ C.$^{-1}$) | 18.3 | 29.3 | 20.0 | 22.7 | 19.9 | 20.4 |
| $CTE_{1000-600° C.}$ ($10^{-7°}$ C.$^{-1}$) | 36.6 | 44.5 | 38.7 | 40.7 | 39.1 | 39.2 |
| MOR (psi) | 208 | — | 211 | 183 | 164 | 177 |
| Elastic Modulus (psi) | 2.05E+05 | — | — | 1.97E+05 | 1.67E+05 | 1.76E+05 |
| MOR/E at 25° C. ($10^{-2}$) | 0.102 | — | — | 0.093 | 0.098 | 0.101 |
| $TSL_{Down}$ (° C.) = 600 + (MOR/E)/$CTE_{1000-600° C.}$ | 877 | — | — | 828 | 850 | 857 |
| $TSL_{Up}$ (° C.) = 500 + (MOR/E)/$CTE_{500-1000° C.}$ | 1055 | — | — | 910 | 992 | 994 |

The examples provided have been made by mulling component powders with water and an organic binder, followed by extrusion, drying, and firing. Some compositions were extruded as 8-mm diameter rods, which were placed inside glass tubes whose ends were covered loosely with aluminum foil and dried in a hot-air oven. Other compositions were extruded into a honeycomb geometry having approximately 300 square cells per square inch and 0.013-0.014-inch thick walls. Honeycomb ware was partially dried in a microwave oven, followed by drying to completion in a hot-air oven. Samples were subsequently fired in an electric kiln under the indicated firing cycle in the indicated atmosphere followed by cooling. Soak temperatures are also provided in Tables 6 to 10 and 12 to 13. These examples will be discussed further below. For the examples in Tables 6-10, relative length changes, $\Delta L/L_{dried}$, and diameter changes, $\Delta D/D_{dried}$, were determined by measurement of the sample dimensions after drying and after firing ("dried to fired"). For examples in Tables 12-13, the diameter of the honeycomb sample after firing was referenced to the diameter of the metal mask that was placed in front of the extrusion die to compute a "mask-to-fired" relative dimensional change, $\Delta D/D_{mask}$. The "mask-to-fired" shrinkage is equal to $(-1)(\Delta D/D_{mask})$. CTE was measured parallel to the honeycomb channels or the axis of the rod by dilatometry. Porosity and pore size distribution were derived from mercury porosimetry measurements. Modulus of rupture was measured at room temperature by the four-point method, and Young's elastic modulus was measured at room temperature by a sonic resonance technique, both parallel to the extrusion direction of the ware. The weight percentages of crystalline phases and unit cell dimensions of the tialite phase were determined by X-ray diffractometry using Rietveld analysis. Compositions of the tialite phase for some examples were determined by electron probe microanalysis.

Figure 2:
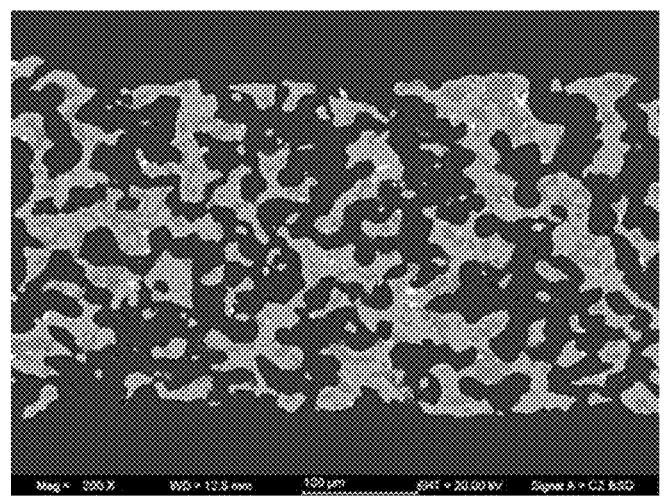
FIG. 2 presents a SEM micrograph of a polished cross section orthogonal to the channel axes of the ceramic honeycomb of Exemplary Example 7 at a magnification of 200×.

FIG. 1 presents a scanning electron microscope (SEM) micrograph of a polished cross section orthogonal to the channel axes of the ceramic honeycomb of Exemplary Example 7 at a magnification of 35×. FIG. 2 presents a SEM micrograph of a polished cross section orthogonal to the channel axes of the ceramic honeycomb of Exemplary Example 7 at a magnification of 200×. FIG. 1 shows an asymmetric channel geometry of non-equal cross sectional areas, alternating in size, and good porosity size and distribution throughout the walls. FIG. 2 shows detail of the wall material and porosity as well as the different phases (tialite, light gray; mullite, dark gray; and a monoclinic zirconium oxide based phase, white) present in the wall material.

Figure 3:
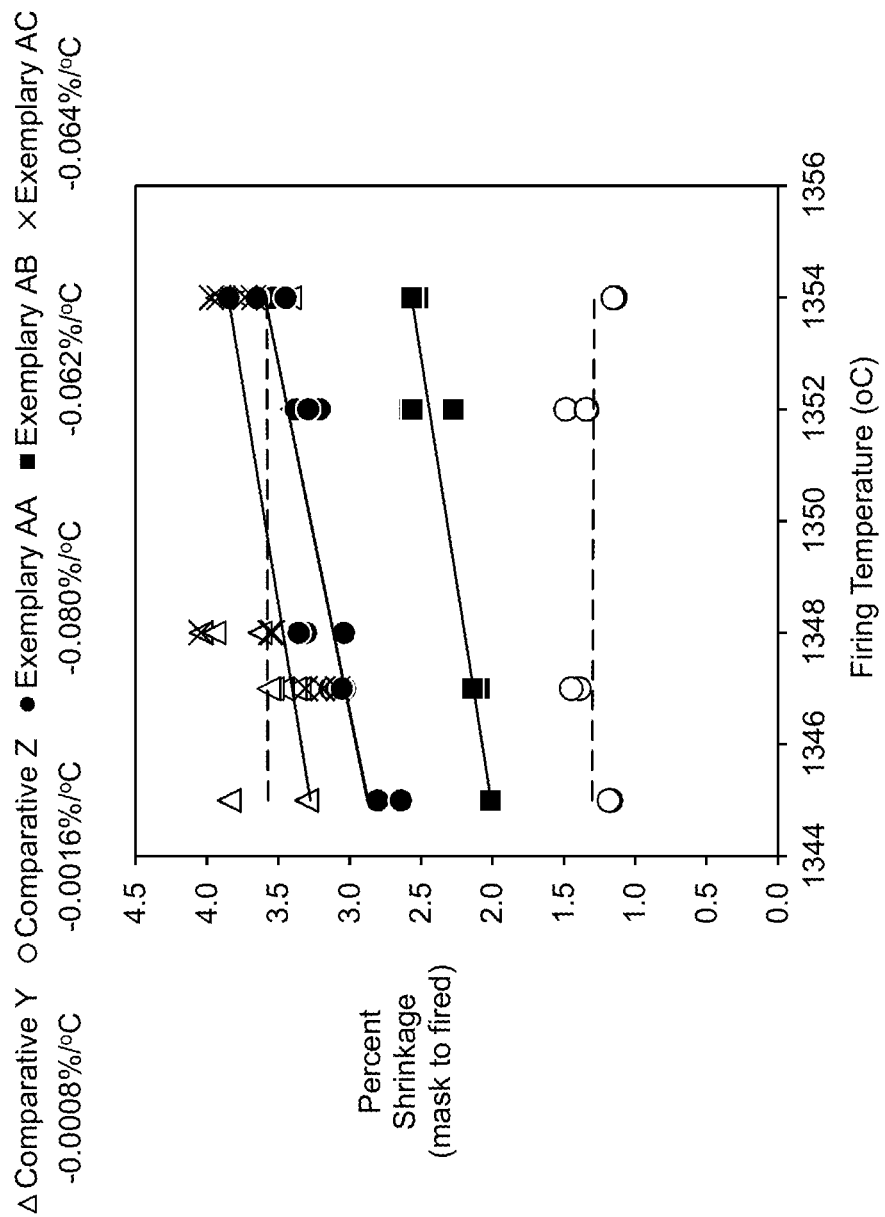
FIG. 3 shows a graphical plot of shrinkage versus firing temperature data for Comparative Examples and Exemplary Examples.

FIG. 3 shows a graphical plot of "mask-to-fired" shrinkage versus firing temperature data for Comparative Examples and Exemplary Examples. FIG. 3 shows $CeO_2$ alone in the ceramic articles of GMAT composition lacks good control of shrinkage by changing firing temperature, despite providing good CTE (Tables 12 and 13). The ceramic articles of GMAT including zirconia alone exhibit fair to good control of shrinkage by changing firing temperature, but do not have low CTE (Tables 12 and 13). The ceramic articles of GMAT composition having ceria and zirconia together exhibit low CTE and provide a good to excellent ability to control shrinkage by changing firing temperature as shown in FIG. 3.

Table 14 provides compositions of the tialite phase in Comparative Examples and Exemplary Examples as determined by electron probe microanalysis.

TABLE 14

| | Example Number | | | | | | | | |
|---|---|---|---|---|---|---|---|---|---|
| | 1 | 2 | 5 | 6 | 7 | 8 | 9 | 11 | 12 |
| Weight percentage of metal oxides in tialite phase | | | | | | | | | |
| $ZrO_2$ | 0.00 | 0.00 | 1.15 | 1.06 | 1.34 | 1.35 | 1.40 | 1.38 | 1.34 |
| $Al_2O_3$ | 51.87 | 52.16 | 51.70 | 52.31 | 52.77 | 52.87 | 52.63 | 52.53 | 52.77 |
| $TiO_2$ | 45.86 | 45.83 | 44.84 | 44.76 | 44.15 | 44.17 | 44.13 | 44.50 | 44.15 |
| $Fe_2O_3$ | 0.00 | 0.00 | 0.02 | 0.02 | 0.02 | 0.02 | 0.02 | 0.02 | 0.02 |
| MgO | 1.43 | 1.35 | 1.37 | 1.22 | 1.06 | 1.06 | 1.08 | 1.17 | 1.06 |
| $SiO_2$ | 0.39 | 0.29 | 0.33 | 0.32 | 0.34 | 0.35 | 0.34 | 0.32 | 0.34 |
| $Ce_2O_3$ | 0.00 | 0.03 | −0.01 | 0.00 | 0.00 | 0.01 | 0.00 | 0.01 | 0.00 |
| Number of atoms per five-oxygen formula unit in tialite phase | | | | | | | | | |
| Zr | 0.000 | 0.000 | 0.017 | 0.016 | 0.020 | 0.020 | 0.021 | 0.021 | 0.020 |
| Al | 1.867 | 1.875 | 1.871 | 1.886 | 1.902 | 1.904 | 1.900 | 1.892 | 1.902 |
| Ti | 1.053 | 1.051 | 1.035 | 1.030 | 1.015 | 1.015 | 1.017 | 1.022 | 1.015 |
| Fe | 0.003 | 0.003 | 0.003 | 0.003 | 0.003 | 0.003 | 0.003 | 0.003 | 0.003 |
| Mg | 0.065 | 0.062 | 0.063 | 0.056 | 0.048 | 0.048 | 0.049 | 0.053 | 0.048 |
| Si | 0.012 | 0.009 | 0.011 | 0.010 | 0.012 | 0.011 | 0.011 | 0.010 | 0.012 |
| Ce | 0.000 | 0.000 | 0.000 | 0.000 | 0.000 | 0.000 | 0.000 | 0.000 | 0.000 |

According to exemplary embodiments of the disclosure, combined addition of a cerium oxide component and zirconium oxide component to tialite+silicate ceramic provides a lower coefficient of thermal expansion, and higher thermal shock resistance, than can be achieved with equivalent amounts of either cerium oxide or zirconium oxide alone, thereby enabling a substantial reduction in the amount of cerium oxide required to achieve a given CTE, and a reduction in the cost of the raw material ingredients to make the ceramic article. In some embodiments, the addition zirconium oxide to the ceramic may also increase the % porosity of the ceramic, thereby enabling the use of a lower amount of pore forming agent, which may allow for a shorter firing cycle or higher select rate of non-cracked ware after firing. Moreover, the combination of cerium and zirconium enables better control of mask-to-fired shrinkage by changes in firing temperature than is possible for composition that contain cerium or zirconium alone.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A ceramic article, comprising:
a tialite phase;
at least one silicate phase;
at least 1 wt % MgO;
at least 0.1 wt % rare earth oxide;
at least 0.1 wt % $ZrO_2$,
wherein metal oxide constituents of the article satisfy at least one of the relations 3(mole % $TiO_2$)/(100+mole % $Al_2O_3$)<1.0 and

[2(mole % $Al_2O_3$)+3(mole % MgO)]/110>1.0, where mole % $TiO_2$=100[(moles $TiO_2$)/(moles $TiO_2$+moles $Al_2O_3$+moles MgO+moles $ZrO_2$)], mole % $Al_2O_3$=100[(moles $Al_2O_3$)/(moles $TiO_2$+moles $Al_2O_3$+moles MgO+moles $ZrO_2$)], and mole % MgO=100 [(moles MgO)/(moles $TiO_2$+moles $Al_2O_3$+moles MgO+moles $ZrO_2$)],
wherein the sum of $ZrO_2$ and the rare earth oxide is greater than 0.5 wt %, and
wherein the amount of $Fe_2O_3$ is less than 0.5 wt %.

2. The ceramic article of claim 1, wherein the metal oxide constituents of the article satisfy at least one of the relations 3(mole % $TiO_2$)/(100+mole % $Al_2O_3$)<0.99 and [2(mole % $Al_2O_3$)+3(mole % MgO)]/110>1.01.

3. The ceramic article of claim 1, wherein the metal oxide constituents of the article satisfy at least one of the relations 3(mole % $TiO_2$)/(100+mole % $Al_2O_3$)<0.98 and [2(mole % $Al_2O_3$)+3(mole % MgO)]/110>1.02.

4. The ceramic article of claim 1, wherein the metal oxide constituents of the article satisfy at least one of the relations 3(mole % $TiO_2$)/(100+mole % $Al_2O_3$)<0.96 and [2(mole % $Al_2O_3$)+3(mole % MgO)]/110>1.04.

5. The ceramic article of claim 1, wherein (wt % $Al_2O_3$)/(wt % $TiO_2$)+1.280(wt % MgO)/(wt % $TiO_2$)>1.28.

6. The ceramic article of claim 1, wherein (wt % $Al_2O_3$)/(wt % $TiO_2$)+1.280(wt % MgO)/(wt % $TiO_2$)>1.30.

7. The ceramic article of claim 1, wherein (wt % $Al_2O_3$)/(wt % $TiO_2$)+1.280(wt % MgO)/(wt % $TiO_2$)>1.32.

8. The ceramic article of claim 1, wherein the rare earth oxide comprises at least one of cerium oxide, yttrium oxide and lanthanum oxide.

9. The ceramic article of claim 1, further comprising a glass phase.

10. The ceramic article of claim 1, comprising a composition, of 50-99 wt % tialite phase, 0-50 wt % mullite, and 0-50 wt % cordierite.

11. The ceramic article of claim 10, wherein the amount of mullite is between 10 and 30 wt %, the ceramic article is substantially cordierite-free, and
the tialite phase comprises a composition satisfying the expression $0.03 \leq m \leq 0.10$ where m is the number of magnesium atoms per 5 oxygen atoms.

12. The ceramic article of claim 10, wherein the amount of tialite phase is between 50 and 75 wt %, the amount of mullite is between 3 and 15 wt %, and the amount of cordierite is between 10 and 30 wt %.

13. The ceramic article of claim 1, further comprising at least one of corundum, magnesium aluminate rich spinel, sapphirine, rutile, cerium oxide solid solution, zirconium oxide solid solution, zirconium titanate, zircon, and cerium titanate.

14. The ceramic article of claim 1, wherein the tialite phase comprises a composition satisfying the expression $0.03 \leq m \leq 0.30$ where m is the number of magnesium atoms per 5 oxygen atoms.

15. The ceramic article of claim 14, wherein $0.07 \leq m$.

16. The ceramic article of claim 1, comprising, as expressed in weight percent on an oxide basis, at least 0.2 wt % and less than or equal to 10 wt % $ZrO_2$.

17. The ceramic article of claim 1, comprising, as expressed in weight percent on an oxide basis, at least 0.5 wt % and less than or equal to 3.5 wt % $ZrO_2$.

18. The ceramic article of claim 1, comprising, as expressed in weight percent on an oxide basis, at least 0.1 wt % and less than or equal to 3.0 wt % $CeO_2$.

19. The ceramic article of claim 1, comprising, as expressed in weight percent on an oxide basis, at least 0.4 wt % and less than or equal to 1.0 wt % $CeO_2$.

20. The ceramic article of claim 1, wherein the ceramic article comprises a coefficient of thermal expansion (CTE), as measured between 25-1000° C., of less than or equal to $15 \times 10^{-7}/°C$.

21. The ceramic article of claim 1, wherein the ceramic article comprises a MOR/E of at least $0.09 \times 10^{-2}$, wherein MOR is the four-point modulus of rupture and E is Young's elastic modulus measured by sonic resonance, both measured at room temperature.

22. The ceramic article of claim 1, wherein the ceramic article comprises a thermal shock limit (TSL) expressed as $TSL_{Down}(°C.)=600°C.+(MOR/E)/CTE_{1000-600°C.}$
greater than 800° C., where $CTE_{1000-600°C.}$ is the mean CTE between 1000 and 600° C. upon cooling after having been heated to 1000° C., wherein MOR is the four-point modulus of rupture and E is Young's elastic modulus measured by sonic resonance, both measured at room temperature.

23. The ceramic article of claim 1, wherein the ceramic article comprises a thermal shock limit (TSL) expressed as $TSL_{Up}(°C.)=500°C.+(MOR/E)/CTE_{500-1000°C.}$ at least 850° C., where $CTE_{500-1000°C.}$ is the mean CTE between 500 and 1000° C. upon heating, wherein MOR is the four-point modulus of rupture and E is Young's elastic modulus measured by sonic resonance, both measured at room temperature.

24. The ceramic article of claim 1, wherein the ceramic article comprises a total porosity % P greater than or equal to 45% by volume.

25. The ceramic article of claim 1, comprising a median pore diameter $d_{50}$ in a range of 8 μm to 30 μm.

26. The ceramic article of claim 25, comprising a median pore diameter $d_{50}$ in the range of from 12 μm to 23 μm.

27. The ceramic article of claim 1, comprising a $(d_{50}-d_{10})/d_{50}$ less than or equal to 0.25.

28. A porous honeycomb body comprising the ceramic article of claim 1, wherein the honeycomb body comprises a plurality of axially extending end-plugged inlet and outlet cells.

29. A method of manufacturing a ceramic article, comprising:
providing an inorganic batch composition comprising a silicon containing source, an aluminum containing source, a titanium containing source, a magnesium containing source, a rare earth containing source and a zirconium containing source;
mixing the inorganic batch composition together with one or more processing aid selected from the group consisting of a plasticizer, lubricant, binder, pore former, and solvent, to form a plasticized ceramic precursor batch composition;
shaping the plasticized ceramic precursor batch composition into a green body; and
firing the green body under conditions effective to convert the green body into a ceramic article comprising:
a tialite phase;
at least one silicate phase;
at least 1 wt % MgO;
at least 0.1 wt % rare earth oxide; and
at least 0.1 wt % $ZrO_2$,
wherein metal oxide constituents of the article satisfy at least one of the relations 3(mole % $TiO_2$)/(100+mole % $Al_2O_3$)<1.0 and

[2(mole % $Al_2O_3$)+3(mole % MgO)]/110>1.0, where mole % $TiO_2$=100[(moles $TiO_2$)/(moles $TiO_2$+moles $Al_2O_3$+moles MgO+moles $ZrO_2$)], mole % $Al_2O_3$=100[(moles $Al_2O_3$)/(moles $TiO_2$+moles $Al_2O_3$+moles MgO+moles $ZrO_2$)], and mole % MgO=100 [(moles MgO)/(moles $TiO_2$+moles $Al_2O_3$+moles MgO+moles $ZrO_2$)],
wherein the sum of $ZrO_2$ and the rare earth oxide is greater than 0.5 wt %, and
wherein the amount of $Fe_2O_3$ is less than 0.5 wt %.

30. The method of claim 29, wherein the rare earth oxide comprises at least one of cerium oxide, yttrium oxide and lanthanum oxide.

31. The method of claim 29, wherein the ceramic article comprises tialite phase between 50 and 99 wt%, mullite between 0 and 50 wt%, and cordierite between 0 and 50 wt%.

32. The method of claim 29, wherein the plasticized ceramic precursor batch composition is shaped by extrusion.

33. The method of claim 29, wherein the firing conditions effective to convert the green body into a ceramic article comprise heating the green body at a hold temperature in the range of 1300° C. to 1550° C. and maintaining the hold temperature for a hold time sufficient to convert the green body into a ceramic article.

* * * * *